US011402506B2

(12) United States Patent
Ohtomo et al.

(10) Patent No.: US 11,402,506 B2
(45) Date of Patent: Aug. 2, 2022

(54) LASER MEASURING METHOD AND LASER MEASURING INSTRUMENT

(71) Applicant: TOPCON Corporation, Tokyo-to (JP)

(72) Inventors: Fumio Ohtomo, Saitama (JP); Kaoru Kumagai, Tokyo-to (JP); Ken-ichiro Yoshino, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 937 days.

(21) Appl. No.: 16/132,869

(22) Filed: Sep. 17, 2018

(65) Prior Publication Data

US 2019/0094363 A1 Mar. 28, 2019

(30) Foreign Application Priority Data

Sep. 25, 2017 (JP) .............................. JP2017-183704

(51) Int. Cl.
*G01S 17/08* (2006.01)
*G01S 17/89* (2020.01)
(Continued)

(52) U.S. Cl.
CPC ............ *G01S 17/08* (2013.01); *B64C 39/024* (2013.01); *G01C 5/005* (2013.01); *G01S 7/4808* (2013.01);
(Continued)

(58) Field of Classification Search
None
See application file for complete search history.

(56) References Cited

U.S. PATENT DOCUMENTS 5,249,046 A * 9/1993 Ulich .................... G01S 7/4802
348/145
5,359,403 A 10/1994 Grosmann et al.
(Continued)

FOREIGN PATENT DOCUMENTS

JP 2012-63236 A 3/2012
JP 2013-185849 A 9/2013
(Continued)

OTHER PUBLICATIONS

European communication dated Feb. 12, 2019 in corresponding European patent application No. 18195343.1.

*Primary Examiner* — Yuqing Xiao
*Assistant Examiner* — Benjamin Richard Hebert
(74) *Attorney, Agent, or Firm* — Nields, Lemack & Frame, LLC

(57) ABSTRACT

A laser measuring instrument comprises a light emitter, a driver, a scanning unit, a light receiving signal processing module for detecting a reciprocating time per pulsed light of a distance measuring light and performing a distance measurement, and a timing generating circuit for issuing a timing signal, wherein the timing generating circuit is configured to issue a timing signal for making the light emitter pulse-emit in a short cycle and a timing signal for pausing a light emission, the driver is configured to make the light emitter pulse-emit according to the timing signals, a light emission time interval in the short cycle is set such that a measuring point is multiply irradiated with the pulsed light by two or more times within a time when the pulsed light passes the measuring point, and the light receiving signal processing module is configured to integrate acquired light receiving signals and to carry out the distance measurement.

14 Claims, 15 Drawing Sheets

(51) Int. Cl.
*G01S 7/481* (2006.01)
*G01S 17/42* (2006.01)
*G01S 7/48* (2006.01)
*G01S 17/86* (2020.01)
*B64C 39/02* (2006.01)
*G01S 17/66* (2006.01)
*G01C 5/00* (2006.01)
*G02B 5/04* (2006.01)
*H01S 3/0941* (2006.01)
*H04N 5/225* (2006.01)

(52) U.S. Cl.
CPC .......... *G01S 7/4815* (2013.01); *G01S 7/4817* (2013.01); *G01S 7/4818* (2013.01); *G01S 17/42* (2013.01); *G01S 17/66* (2013.01); *G01S 17/86* (2020.01); *G01S 17/89* (2013.01); *G02B 5/04* (2013.01); *H01S 3/0941* (2013.01); *B64C 2201/14* (2013.01); *H04N 5/2257* (2013.01)

(56) References Cited

U.S. PATENT DOCUMENTS

| | | | |
|---|---|---|---|
| 7,639,347 B2 * | 12/2009 | Eaton | G01S 17/89 356/4.01 |
| 2004/0169840 A1 * | 9/2004 | Hoashi | G01S 17/931 356/4.01 |
| 2005/0205672 A1 | 9/2005 | Ando et al. | |
| 2010/0046953 A1 * | 2/2010 | Shaw | H01S 5/423 398/115 |
| 2015/0160346 A1 * | 6/2015 | Stutz | G01S 7/4861 356/5.01 |
| 2015/0185313 A1 | 7/2015 | Zhu | |
| 2016/0084651 A1 * | 3/2016 | Hinderling | H01L 31/165 356/4.01 |
| 2016/0238385 A1 | 8/2016 | Ohtomo et al. | |
| 2016/0238708 A1 | 8/2016 | Ohtomo et al. | |
| 2016/0291136 A1 * | 10/2016 | Lindskog | G01S 7/4813 |
| 2016/0320473 A1 | 11/2016 | Matsumoto et al. | |
| 2017/0168141 A1 | 6/2017 | Yuasa | |
| 2017/0227357 A1 | 8/2017 | Ohtomo et al. | |
| 2017/0307758 A1 * | 10/2017 | Pei | G01S 7/4972 |
| 2019/0086550 A1 * | 3/2019 | Dussan | G01S 17/86 |
| 2021/0157000 A1 * | 5/2021 | Imaki | G01S 7/4815 |

FOREIGN PATENT DOCUMENTS

| | | |
|---|---|---|
| JP | 2014-62789 A | 4/2014 |
| JP | 2016-151422 A | 8/2016 |
| JP | 2016-151423 A | 8/2016 |
| JP | 2016-211873 A | 12/2016 |
| JP | 2017-142081 A | 8/2017 |

* cited by examiner

LASER MEASURING METHOD AND LASER MEASURING INSTRUMENT

BACKGROUND OF THE INVENTION

The present invention relates to a laser measuring method and a laser measuring instrument using a pulsed laser beam as a distance measuring light.

In a laser measuring method using a pulsed laser beam as a distance measuring light, the pulsed laser beam is irradiated to an object to be measured, a reflected light is received, a reciprocating time of the pulsed laser beam is detected, and a distance to the object to be measured is determined. Further, point cloud data is also acquired by moving the distance measuring light with respect to the object to be measured (scanned) and by measuring the distance per pulse.

In order that a distance measurement per pulse is enabled and a measurement accuracy is ensured, a predetermined light receiving amount is required, but the light receiving amount is attenuated or a luminous flux is scattered when the pulsed laser beam is reflected by the object to be measured, and the light receiving amount decreases in accordance with an increase in a distance to be measured. Therefore, in order to enable a measurement of a farther distance, an increase in a diameter of an objective lens and a higher output of the pulsed laser beam are required.

However, the increase in the diameter of the objective lens is accompanied with a size increase and a weight increase in a measuring instrument, and a radiation output of a laser diode emitting the pulsed laser beam is also limited.

Recently, the development and the spread of unmanned aerial vehicles has been noticeable, and the ground is measured by mounting a measuring instrument on the unmanned aerial vehicle.

For instance, in a case where a laser scanner is mounted as a measuring instrument on a small type unmanned aerial vehicle and a topography is measured by scanning the ground from above the sky, a reduction in a size and a weight of the laser scanner is required. Further, a distance which can be measured by the laser scanner decides a flight altitude of the small type unmanned aerial vehicle and a range which can be scanned (a measurement range).

For instance, in a case where a laser scanner is mounted as a measuring instrument on a small type unmanned aerial vehicle and the topography is measured by scanning the ground from above the sky, a reduction in the size and weight of the laser scanner is required. Further, a distance which can be measured by the laser scanner decides a flight altitude of the small type unmanned aerial vehicle and a range which can be scanned (a measurement range).

SUMMARY OF THE INVENTION

It is an object of the present invention to provide a laser measuring method and a laser measuring instrument which enable an increase in a measurement distance without increasing a size of a measuring instrument and an output of a laser diode in a laser measurement.

To attain the object as described above, in a laser measuring method according to the present invention, a scanning is performed while irradiating a pulsed distance measuring light to a measuring point, a reflected distance measuring light from the measuring point is received, a reciprocating time per pulsed light of the pulsed distance measuring light is detected with respect to the measuring point, and a distance measurement is performed based on the reciprocating time, comprising steps of setting a scanning speed and a light emission cycle of the pulsed light such that the measuring point is multiply irradiated with the pulsed light by two or more times within a time when the pulsed light passes the measuring point, integrating light receiving signals acquired by multiply irradiating the pulsed light by two or more times and carrying out the distance measurement based on the integrated light receiving signals.

Further, in the laser measuring method according to a preferred embodiment, the light receiving signals are acquired with respect to the two or more reflected distance measuring lights acquired by one pulsed light, respectively, and the distance measurement is performed with respect to the two or more light receiving signals.

Further, in the laser measuring method according to the preferred embodiment, the light emission cycle is a distance measuring time difference or more corresponding to a difference of an irregularity of an object to be measured.

Further, in the laser measuring method according to the preferred embodiment, a mode of the scanning is a two-dimensional scanning.

Further, in the laser measuring method according to the preferred embodiment, a mode of the scanning is a circular scanning.

Further, a laser measuring instrument according to the present invention comprises a light emitter for pulse-emitting a distance measuring light, a driver for making the light emitter emit, a scanning unit for scanning while irradiating the distance measuring light, a light receiving signal processing module for receiving a reflected distance measuring light from a measuring point, detecting a reciprocating time per pulsed light of the distance measuring light with respect to the measuring point, and performing a distance measurement based on the reciprocating time, and a timing generating circuit for issuing a timing signal for controlling a light emission timing of the light emitter and a timing signal for controlling a detection timing of the reflected distance measuring light, wherein the timing generating circuit is configured to input a timing signal for pulse-emitting the light emitter in a short cycle and a timing signal for pausing a light emission to the driver, the driver is configured to make the light emitter pulse-emit according to the timing signals from the timing generating circuit, a light emission time interval in the short cycle is set such that the measuring point is multiply irradiated with the pulsed light by two or more times within a time when the pulsed light passes the measuring point, and the light receiving signal processing module is configured to integrate light receiving signals acquired by multiply irradiating the pulsed light by two or more times and to carry out the distance measurement based on the integrated light receiving signals.

Further, in the laser measuring instrument according to the preferred embodiment, the light receiving signal processing module acquires light receiving signals with respect to the two or more reflected distance measuring lights acquired by one pulsed light, respectively, and performs the distance measurement with respect to the two or more light receiving signals, respectively.

Further, in the laser measuring instrument according to the preferred embodiment, a light emission time interval in the short cycle is a distance measuring time difference or more corresponding to a difference of an irregularity of an object to be measured.

Further, the laser measuring instrument according to the preferred embodiment comprises projecting lenses for irradiating the distance measuring lights from the light emitters to an object to be measured and a focusing lens for focusing the reflected distance measuring lights reflected from the object to be measured on photodetectors, wherein the light emitters are provided in plural, the photodetectors are provided in the number corresponding to the light emitters, and each of the light emitters and each of the photodetectors are provided at positions conjugated in relation to an optical system having the projecting lenses and the focusing lens.

Further, the laser measuring instrument according to the preferred embodiment comprises projecting lenses for irradiating the distance measuring lights from the light emitters to an object to be measured and a focusing lens for focusing the reflected distance measuring lights reflected from the object to be measured on photodetectors, wherein the light emitters are provided in plural, optical fibers having a light receiving end surface corresponding to the light emitters are provided on the photodetectors, each of the light emitters and each of the light receiving end surfaces are provided at positions conjugated in relation to an optical system having the projecting lenses and the focusing lens, and the photodetectors are configured to receive the two or more reflected distance measuring lights via the optical fibers.

Further, in the laser measuring instrument according to the preferred embodiment, the scanning unit has an optical axis deflector for deflecting a distance measuring optical axis, the optical axis deflector is constituted by a pair of disk-like optical prisms overlapping each other, each of the optical prisms includes a first optical axis deflector provided at a center and for deflecting the distance measuring light and a second optical axis deflector provided on a periphery of the first optical axis deflector and for deflecting the reflected distance measuring light, each of the optical prisms is rotatable independently, respectively, and the scanning unit is configured to integrally rotate the optical prisms and circularly scan the distance measuring light.

Further, in the laser measuring instrument according to the preferred embodiment, the scanning unit has an optical axis deflector for deflecting a distance measuring optical axis, the optical axis deflector has a scanning mirror which rotates in a vertical direction around a vertical rotation shaft as a center, the distance measuring light enters the scanning mirror concentrically with a rotation axis, and the distance measuring light is deflected by the scanning mirror at a right angle and is one-dimensionally scanned by the scanning mirror.

Further, in the laser measuring instrument according to the preferred embodiment, the laser measuring instrument is mounted on an unmanned aerial vehicle and an optical axis of the laser measuring instrument is directed vertically downward.

Furthermore, in the laser measuring instrument according to the preferred embodiment, the laser measuring instrument is installed on an immovable body via an installation device, and an optical axis of the laser measuring instrument is directed to a horizontal direction.

According to the present invention, in the laser measuring method, a scanning is performed while irradiating a pulsed distance measuring light to a measuring point, a reflected distance measuring light from the measuring point is received, a reciprocating time per pulsed light of the pulsed distance measuring light is detected with respect to the measuring point, and a distance measurement is performed based on the reciprocating time, comprising steps of setting a scanning speed and a light emission cycle of the pulsed light such that the measuring point is multiply irradiated with the pulsed light by two or more times within a time when the pulsed light passes the measuring point, integrating light receiving signals acquired by multiply irradiating the pulsed light by two or more times and carrying out the distance measurement based on the integrated light receiving signals. As a result, the distance measurement, is possible under a condition where a light amount of the reflected distance measuring light per one pulsed light is small, a long distance measurement becomes possible, a duty ratio of a light emitter can be reduced, and it is possible to contribute to a reduction of a manufacturing cost and a prolongation of a life of the light emitter.

Further, according to the present invention, the laser measuring instrument comprises a light emitter for pulse-emitting a distance measuring light, a driver for making the light emitter emit, a scanning unit for scanning while irradiating the distance measuring light, a light receiving signal processing module for receiving a reflected distance measuring light from a measuring point, detecting a reciprocating time per pulsed light of the distance measuring light with respect to the measuring point, and performing a distance measurement based on the reciprocating time, and a timing generating circuit for issuing a timing signal for controlling a light emission timing of the light emitter and a timing signal for controlling a detection timing of the reflected distance measuring light, wherein the timing generating circuit is configured to input a timing signal for pulse-emitting the light emitter in a short cycle and a timing signal for pausing a light emission to the driver, the driver is configured to make the light emitter pulse-emit according to the timing signals from the timing generating circuit, a light emission time interval in the short cycle is set such that the measuring point is multiply irradiated with the pulsed light by two or more times within a time when the pulsed light passes the measuring point, and the light receiving signal processing module is configured to integrate light receiving signals acquired by multiply irradiating the pulsed light by two or more times and to carry out the distance measurement based on the integrated light receiving signals. As a result, the distance measurement is possible under the condition where the light amount of the reflected distance measuring light per one pulsed light is small, a long distance measurement becomes possible, a duty ratio of a light emitter can be reduced, and it is possible to contribute to a reduction of a manufacturing cost and a prolongation of a life of a light emitter.

DETAILED DESCRIPTION OF THE PREFERRED EMBODIMENT

A description will be given below on an embodiment of the present invention by referring to the attached drawings.

First, a description will be given on a case where a measuring instrument is mounted on an unmanned aerial vehicle as a first embodiment. Further, in the first embodiment, for instance, a small type helicopter capable of being remotely controlled or a small type helicopter capable of autonomously flying is used as the unmanned aerial vehicle, and a laser scanner is used as a measuring instrument.

First, a description will be given on general features of the first embodiment by referring to FIG. 1 and FIG. 2.

Figure 1:
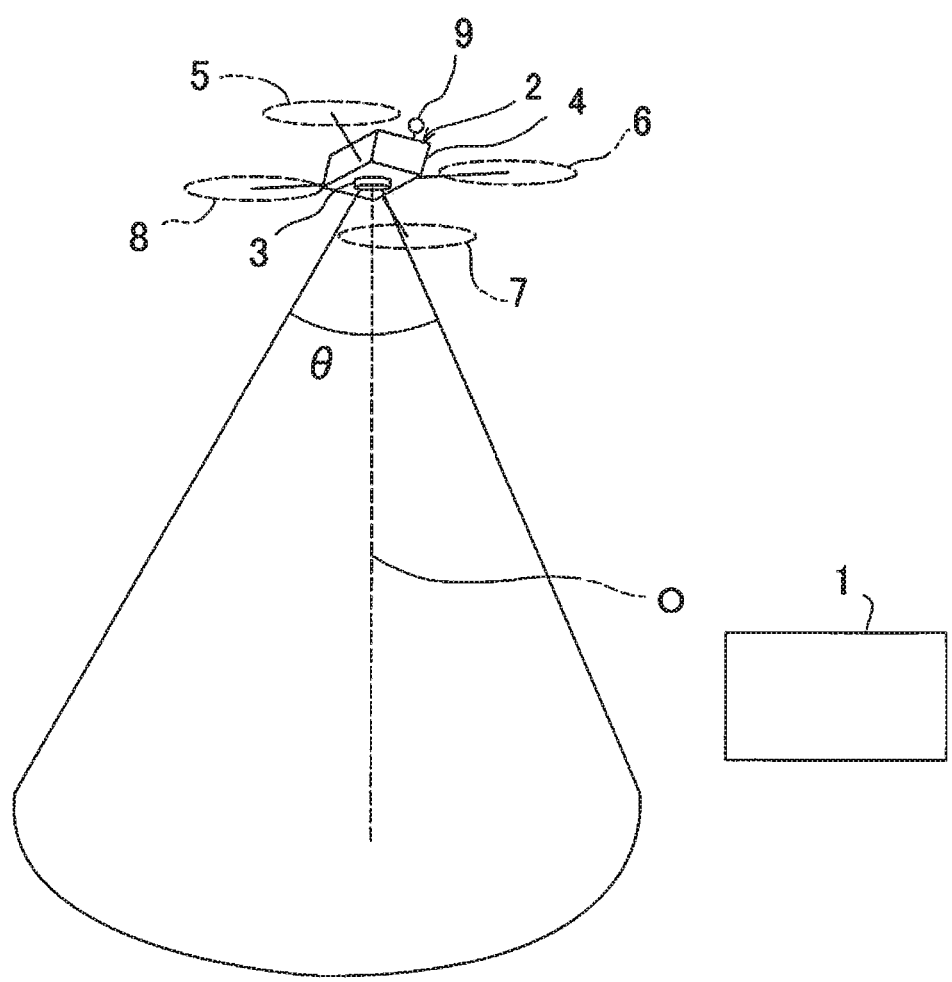
FIG. 1 is a system drawing to show a case where a measuring instrument according to a first embodiment of the present invention is used for an unmanned aerial vehicle.
Figure 2:
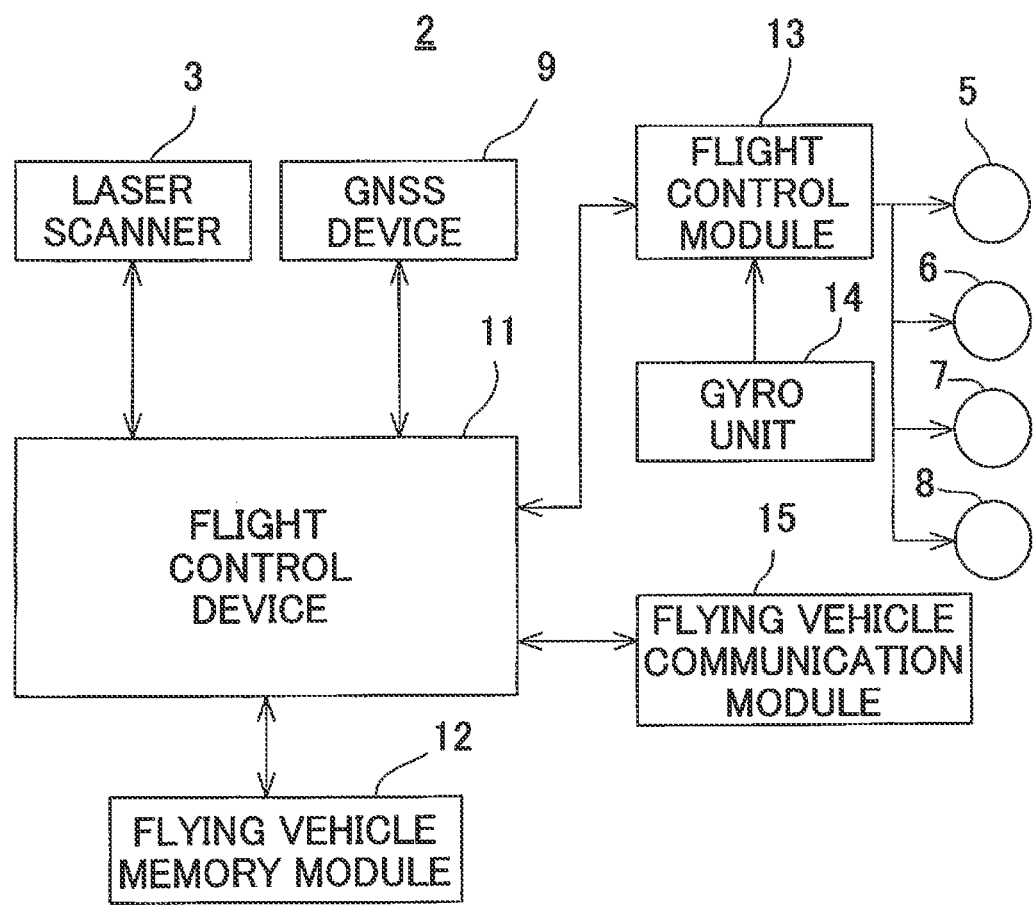
FIG. 2 is a schematical block diagram of the unmanned aerial vehicle.

In FIG. 1, reference numeral 1 denotes a base station control device 1 installed on the ground, and the base station control device 1 is capable of data communication with an unmanned aerial vehicle 2 and a laser scanner 3 and executes a control of a flight of the unmanned aerial vehicle 2, a setting and a change of a flight plan. Further, the base station control device 1 executes a collection, a storage and a management of a measurement result obtained by the laser scanner 3 and a preparation of a topographic map or the like based on the measurement result.

The unmanned aerial vehicle 2 has an airframe 4 and has two or more propeller units provided on the airframe 4, for instance, four sets of front, rear, right and left propeller units 5, 6, 7 and 8, and the propeller units 5, 6, 7 and 8 individually comprise motors, respectively, and a driving of each of the motors is controlled independently. It is to be noted that a gyro unit (to be described later) and the like for detecting attitudes of the propeller units 5, 6, 7 and 8 and the unmanned aerial vehicle 2 make up navigation means.

A description will be given on a schematical configuration of the unmanned aerial vehicle 2 by referring to FIG. 2.

The laser scanner 3 is mounted on the airframe 4, and a GNSS device 9, a flight control device 11, a flying vehicle memory module 12, a flight control module 13, a gyro unit 14, a flying vehicle communication module 15 and the like are provided on the airframe 4.

In the flying vehicle memory module 12, a program required to fly the unmanned aerial vehicle 2, a communication program for performing a communication with the base station control device 1 by the flying vehicle communication module 15, and flight data required for a flight such as a flight route and the like are stored. Further, the flight control device 11 executes an autonomous flight or controls a flight by a remote control based on the programs and the flight data.

The flight control module 13 individually drives and controls the propeller units 5, 6, 7 and 8 based on a flight control command from the flight control device 11 and an attitude state of the flying vehicle detected by the gyro unit 14 and makes the unmanned aerial vehicle 2 fly in a desired attitude and in a desired direction.

The unmanned aerial vehicle 2 has a reference position, and the GNSS device 9 measures the reference position of the unmanned aerial vehicle 2. Here, as the reference position, a position of a mechanical reference point of the unmanned aerial vehicle 2 or a position of a measurement reference point of the laser scanner 3 can be cited. It is preferable that the position of the measurement reference point of the laser scanner 3 is measured by the GNSS device 9.

The laser scanner 3 has a reference optical axis O, and the reference optical axis O extends downward, and the flight control device 11 controls the attitude of the unmanned flying vehicle 2 so that the reference optical axis O becomes vertical or approximately vertical.

It is to be noted that the laser scanner 3 may be provided on the airframe 4 via a gimbal mechanism so that a verticality of the reference optical axis O is more reliably ensured and so that the reference optical axis O is directed vertically downward regardless of an attitude of the airframe 4. It is to be noted that the gimbal mechanism is disclosed in Japanese Unexamined Patent Application Publication No. 2014-62789.

The unmanned aerial vehicle 2 is operated by the remote control from the base station control device 1 or a flight plan is set in the flight control device 11 of the unmanned aerial vehicle 2 from the base station control device 1. Further, the flight control device 11 controls the navigation means and makes the unmanned aerial vehicle 2 fly autonomously according to the flight plan.

Further, the flight control device 11 controls the navigation means, controls the unmanned aerial vehicle 2 so as to fly at a predetermined speed and at a predetermined altitude and controls a flying attitude of the unmanned aerial vehicle 2 horizontally (or the reference optical axis O vertically).

The laser scanner 3 scans a distance measuring light (a pulsed laser beam) with the reference optical axis O as a center.

Here, the laser scanner 3 mounted on the unmanned aerial vehicle 2 may be a laser scanner which reciprocally scans (one-dimensionally scans) the distance measuring light linearly in a direction orthogonal to a flying direction of the unmanned aerial vehicle 2 or may be a laser scanner which two-dimensionally scans the distance measuring light with the reference optical axis O as the center or with the reference optical axis O as an origin. A scanning mode of the laser scanner 3 can be appropriately selected according to a measuring condition.

Figure 3:
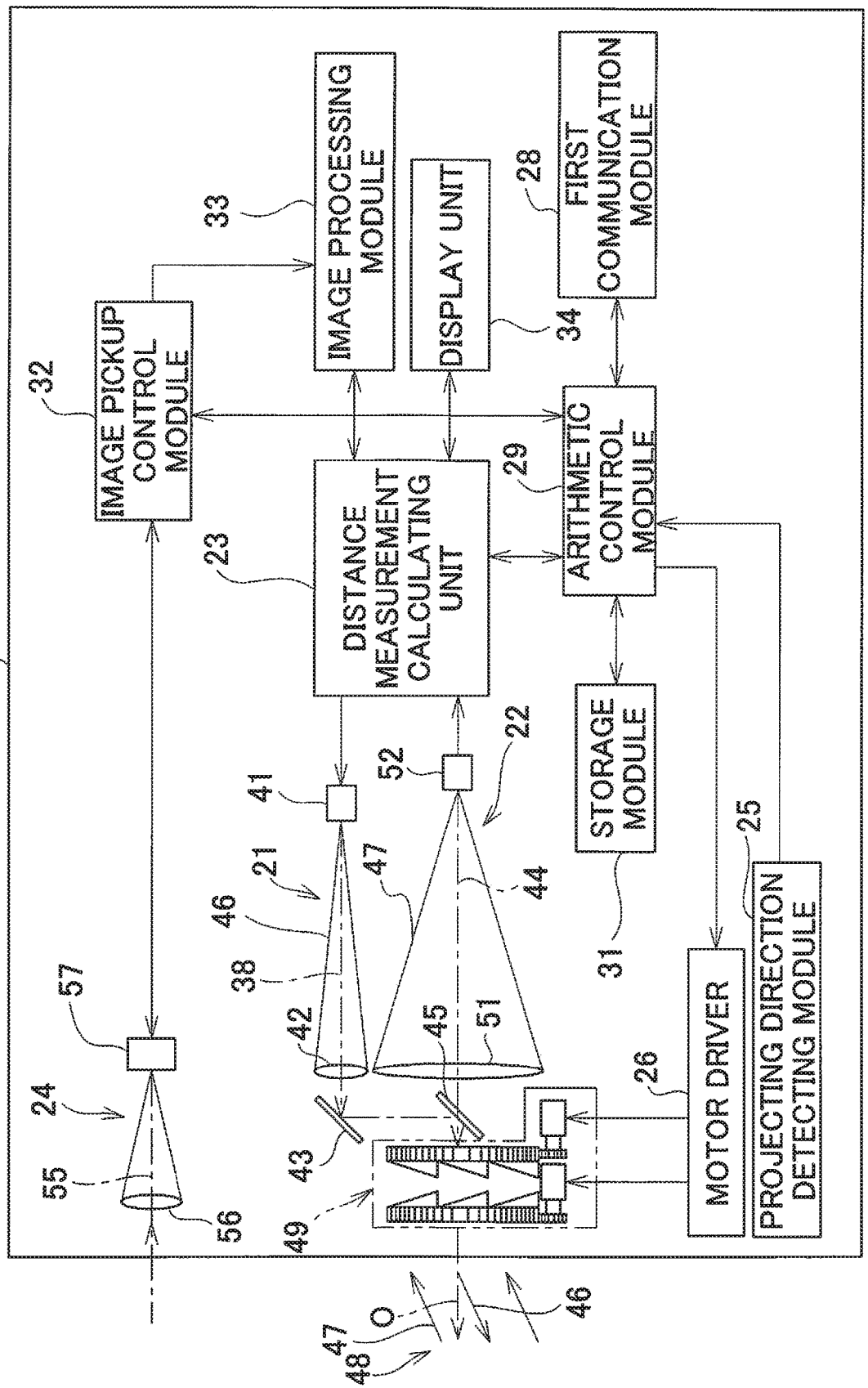
FIG. 3 is a schematical block diagram of the measuring instrument.
Figure 4:
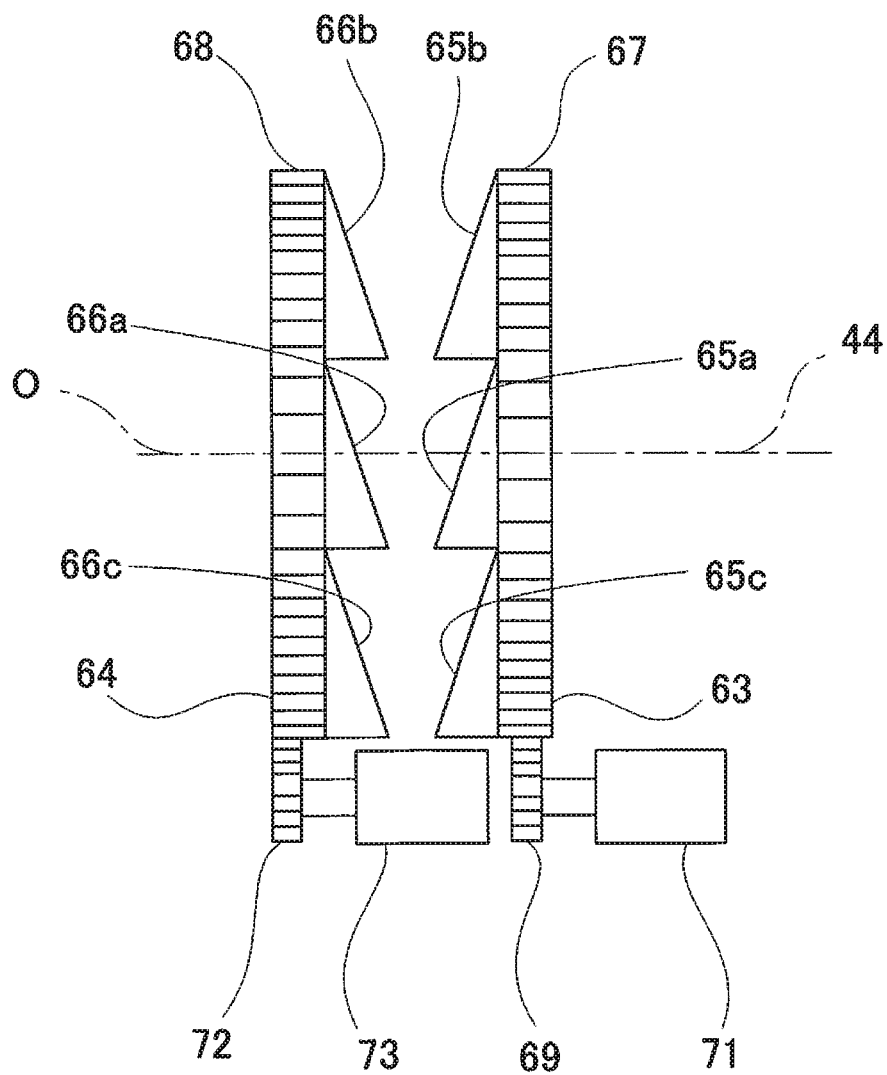
FIG. 4 is an explanatory drawing of a principal part of an optical axis deflector used in the measuring instrument.

FIG. 3 and FIG. 4 show one example of the laser scanner 3. The laser scanner 3 explained in FIG. 3 and FIG. 4 has a structure which two-dimensionally scans the distance measuring light.

In FIG. 3, although the reference optical axis O is shown in a horizontal state, in a state where the laser scanner 3 is mounted on the unmanned aerial vehicle 2, the reference optical axis O becomes vertical or approximately vertical.

Next, a description of the laser scanner 3 will be given concretely by referring to FIG. 3.

The laser scanner 3 comprises a distance measuring light projecting unit 21, a light receiving unit 22, a distance measurement calculating unit 23, an image pickup unit 24, a projecting direction detecting module 25, a motor driver 26, a first communication module 28, an arithmetic control module 29, a storage module 31, an image pickup control module 32, an image processing module 33, a display unit 34 and an optical axis deflector 49, and they are accommodated in a housing 35 and integrated. It is to be noted that the distance measuring light projecting unit 21, the light receiving unit 22, the distance measurement calculating unit 23, the optical axis deflector 49 or the like make up a distance measuring unit which functions as an electronic distance meter.

The distance measuring light projecting unit 21 has a projection optical axis 38, and a light emitter 41 such as a pulsed laser diode (PLD), for instance, is provided on the projection optical axis 38. Further, a projecting lens 42 is provided on the projection optical axis 38. Further, on the projection optical axis 38, a first reflection mirror 43 as a deflecting optical component is provided, and on a light receiving optical axis 44 (to be described later), a second reflection mirror 45 as a deflecting optical component is provided. By the first reflection mirror 43 and by the second reflection mirror 45, the projection optical axis 38 is deflected so as to coincide with the light receiving optical axis 44. The first reflection mirror 43 and the second reflection mirror 45 make up a projection optical axis deflector.

The light emitter 41 emits the pulsed laser beam, and the distance measuring light projecting unit 21 emits the pulsed laser beam emitted from the light emitter 41 as a distance measuring light 46.

A description will be given on the light receiving unit 22. A reflected distance measuring light 47 from an object to be measured enters the light receiving unit 22. The light receiving unit 22 has the light receiving optical axis 44, and the light receiving optical axis 44 coincides with the projection optical axis 38 deflected by the first reflection mirror 43 and the second reflection mirror 45. It is to be noted that a condition where the projection optical axis 38 coincides with the light receiving optical axis 44 is determined as a distance measuring optical axis 48.

The optical axis deflector 49 (to be described later) is disposed on an optical axis on which the projection optical axis 38 as deflected and the light receiving optical axis 44 are coincided with each other, that is, on the distance measuring optical axis 48. A straight optical axis passing through a center of the optical axis deflector 49 is the reference optical axis O (see FIG. 1). The reference optical axis O coincides with the projection optical axis 38 or the light receiving optical axis 44 or the distance measuring optical axis 48 of when the optical axes 38, 44 or 48 is not deflected by the optical axis deflector 49.

The reflected distance measuring light 47 passes through the optical axis deflector 49 and enters a light receiving optical axis 22, and a focusing lens 51 is disposed on the light receiving optical axis 44 of the reflected distance measuring optical light. 47 after entering. Further, a photodetector 52 such as a photodiode (PD) and an avalanche photodiode (APD), for instance, is provided on the light receiving optical axis 44. The focusing lens 51 focuses the reflected distance measuring light 47 on the photodetector 52. The photodetector 52 receives the reflected distance measuring light 47 and issues a light receiving signal. The light receiving signal is input to the distance measurement calculating unit 23, and the distance measurement calculating unit 23 performs the distance measurement to the object to be measured based on a light emitting timing of a distance measuring light and a light receiving timing of the light receiving signal.

A description will be given on the optical axis deflector 49 by referring to FIG. 4.

The optical axis deflector 49 is constituted of a pair of optical prisms 63 and 64. The optical prisms 63 and 64 are designed in a disk-like shape having the same diameter respectively and disposed perpendicularly crossing the distance measuring optical axis 48 concentrically on distance measuring optical axis 48. Further, the optical prisms 63 and 64 are arranged in parallel to each other at a predetermined interval. The optical prisms 63 is molded by an optical glass and has three triangular prisms 65a, 65b and 65c as disposed in parallel. The optical prism 64 has the same structure as the optical prism 63, is molded by an optical glass, and has three triangular prisms 66a, 66b and 66c as disposed in parallel. It is to be noted that all the triangular prisms 65a, 65b and 65c and the triangular prisms 66a, 66b and 66c have optical characteristics which deflects an optical axis passing through the triangular prisms 65a, 65b, 65c, 66a, 66b and 66c at the same deflection angle.

It is to be noted that a width of each of the triangular prisms 65a and 66a positioned at the center is larger than a beam diameter of the distance measuring light 46, and the distance measuring light 46 is configured to pass through only the triangular prisms 65a and 66a.

A central part of the optical axis deflector 49 (the triangular prisms 65a and 66a) is designed as a distance measuring light deflecting unit which is a first optical axis deflector which the distance measuring light 46 passes through and is emitted from. A part other than the central part of the optical axis deflector 49 (both end portions of the triangular prisms 65a and 66a, the triangular prisms 65b and 65c, and the triangular prisms 66b and 66c) is designed as a reflected distance measuring light deflecting unit which is a second optical axis deflector which the reflected distance measuring light 47 passes through and enters.

The optical prisms 63 and 64 are disposed independently and individually rotatable with the distance measuring optical axis 48 as the center, respectively. The optical prisms 63 and 64, when their rotating directions, rotation amounts and rotating speeds are individually controlled, deflect the projection optical axis 38 of the distance measuring light 46 as emitted in an arbitrary direction, and deflect the light receiving optical axis 44 of the reflected distance measuring light 47 as received in parallel to the projection optical axis 38.

An outer shape of each of the optical prisms 63 and 64 is designed as a circle shape around the distance measuring optical axis 48 as the center, respectively. Further, by taking an expansion of the reflected distance measuring light 47 into consideration, diameters of the optical prisms 63 and 64 are set so that a sufficient light amount can be obtained.

A ring gear 67 is fitted with an outer periphery of the optical prism 63, and a ring gear 68 is fitted with an outer periphery of the optical prism 64.

A driving gear 69 meshes with the ring gear 67, and the driving gear 69 is fixed to an output shaft of a motor 71. Similarly, a driving gear 72 meshes with the ring gear 68, and the driving gear 72 is fixed to an output shaft of a motor 73. The motors 71 and 73 are electrically connected to the motor driver 26.

As the motors 71 and 73, a motor capable of detecting a rotation angle or a motor which rotates corresponding to a driving input value such as a pulse motor, for instance, is used. Alternatively, a rotation angle detector which detects a rotation amount (rotation angle) of a motor such as an encoder or the like, for instance, may be used to detect the rotation amounts of the motors 71 and 73. The rotation amounts of the motors 71 and 73 are detected respectively, and the motors 71 and 73 are individually controlled by the motor driver 26 it is to be noted that an encoder may be mounted directly on the ring gears 67 and 68 respectively, and configured so that the rotation angles of the ring gears 67 and 68 are directly detected by the encoders.

The driving gears 69 and 72 and the motors 71 and 73 are provided at positions not interfering with the distance measuring light projecting unit 21, for instance, on lower sides of the ring gears 67 and 68.

The projecting lens 42, the first reflection mirror 43, the second reflection mirror 45, the distance measuring light deflecting unit or the like make up a light projecting optical system. Further, the reflected distance measuring light deflecting unit, the focusing lens 51 or the like make up a light receiving optical system.

The distance measurement calculating unit 23 controls the light emitter 41, and makes the light emitter 41 pulse-emit or burst-emit (intermittently emit) a laser beam as the distance measuring light 46. The projection optical axis 38 is deflected by the triangular prisms 65a and 66a (the distance measuring light deflecting unit) so that the distance measuring light 46 is directed toward the object to be measured. The distance measurement is performed under a condition where the distance measuring optical axis 48 sights the object to be measured. It is to be noted that a burst emission is disclosed in Japanese Unexamined Patent Application Publication No. 2016-161411.

The reflected distance measuring light 47 as reflected from the object to be measured enters through the triangular prisms 65b and 65c and the triangular prisms 66b and 66c (the reflected distance measuring light deflecting unit) and the focusing lens 51, and is received by the photodetector 52. The photodetector 52 sends a light receiving signal to the distance measurement calculating unit 23, the distance measurement calculating unit 23 performs a distance measurement of a measuring point (a point irradiated by the distance measuring light) per pulsed laser beam (hereinafter referred to as a pulsed light) based on the light receiving signal from the photodetector 52, and distance measurement data is stored in the storage module 31.

The projecting direction detecting module 25 detects rotation angles of the motors 71 and 73 by counting driving pulses input to the motors 71 and 73. Alternatively, based on a signal from an encoder, the projecting direction detecting module 25 detects the rotation angles of the motors 71 and 73. Further, the projecting direction detecting module 25 calculates rotational positions of the optical prisms 63 and 64 based on the rotation angles of the motors 71 and 73. Further, the projecting direction detecting module 25 calculates a deflection angle and a projecting direction (a deflecting direction) with respect to the reference optical axis O of the distance measuring light 46 per each pulsed light based on the optical characteristics and the rotational positions of the optical prisms 63 and 64. A calculation result (angle measurement result) is input to the arithmetic control module 29 in association with the distance measurement result. It is to be noted that in a case where the distance measuring light 46 is burst-emitted, the distance measurement is carried out per intermittent distance measuring light.

The arithmetic control module 29 controls a deflecting action by the optical axis deflector 49 by controlling rotating directions and rotating speeds of the motors 71 and 73 and a rotation ratio between the motors 71 and 73. Further, the arithmetic control module 29 calculates a horizontal angle and a vertical angle of the measuring point with respect to the distance measuring optical axis 48 from the deflection angle and the projecting direction of the distance measuring light 46. Further, by associating the horizontal angle and the vertical angle regarding the measuring point with the distance measurement data, three-dimensional data of the object to be measured can be acquired.

In a state where a rotation of the optical axis deflector 49 is fixed, the distance measurement of a specific measuring point can be performed.

Further, by rotating the optical axis deflector 49 or by dynamically deflecting the optical axis deflector 49 with a required pattern, the distance measuring light 46 can be scanned with the required pattern, and in this case, the laser scanner 3 functions as a laser scanner for acquiring point cloud data.

When the laser scanner 3 is made to function as the laser scanner, the optical axis deflector 49, the motor 71, the motor 73 and the like make up a scanning unit. In the present embodiment, although the example in which the optical prism 63 and the optical prism 64 are used in a pair is described, it may be so configured that either one of the optical prism 63 or the optical prism 64 is used.

A description of the image pickup unit 24 will be given.

The image pickup unit 24 has an image pickup optical axis 55 in parallel to the reference optical axis O of the laser scanner 3 and an image pickup lens 56 disposed on the image pickup optical axis 55. The image pickup unit 24 is a camera having a field angle approximately equal to a maximum deflection angle (e.g. ±30°) by the optical prisms 63 and 64 or having a field angle larger than the maximum deflection angle such as 60 to 65°, for instance, and the image pickup unit 24 acquires image data including a scanning range of the laser scanner 3. A relationship between the image pickup optical axis 55 and the projection optical axis 38 and a relationship between the image pickup optical axis 55 and the reference optical axis O are already known, the image pickup optical axis 55 and the reference optical axis O are in parallel, and further, distances between each of the optical axes are known values. Further, the image pickup unit 24 is capable of acquiring moving images or continuous images.

The image pickup control module 32 controls an image pickup of the image pickup unit 24 in a case where the image pickup unit 32 picks up the moving images or the continuous images, the image pickup control module 32 synchronizes a timing of acquiring frame images constituting the moving images or the continuous images with a timing of scanning (a timing of measuring distance per pulsed laser beam) by the laser scanner 3. The arithmetic control module 29 also executes an association between the images and the measurement data (distance measurement data, angle measurement data).

An image pickup element 57 of the image pickup unit 24 is a CCD or a CMOS sensor which is an aggregate of pixels, and is configured such that a position of each pixel can be specified on an image element. For instance, each pixel has pixel coordinates in a coordinate system having the image pickup optical axis 55 as an origin, and the position on the image element is specified by the pixel coordinates. Therefore, a photodetecting position on the image pickup element 57 can be detected based on the signal from each pixel. Further, the signal from each pixel includes information of the pixel coordinates and the light receiving signal.

Further, since the image pickup optical axis 55 of the image pickup unit 24 is in parallel to the reference optical axis O, and further, since the image pickup optical axis 55 and the reference optical axis O is in a known relationship, by specifying a position on the image pickup element 57, the deflection angle with respect to the reference optical axis O of the specified position can be detected.

The image processing module 33 performs an image processing such as an edge extraction processing, an extraction of feature points, an image tracking processing, an image matching and the like to the image data acquired by the image pickup unit 24. Further, the image processing module 33 prepares a gray-scaled image from the image data.

The display unit 34 displays an image acquired by the image pickup unit 24 and displays a measuring state, the measurement data and the like. It is to be noted that the display unit. 34 is made a touch panel and also functions as an operation unit. Further, in a case where a remote control of the unmanned aerial vehicle 2 is to be performed from the base station control device 1, the display unit 34 can be omitted.

A description of a deflecting action and a scan action of the optical axis deflector 49 will be given by referring to FIG. 5A, FIG. 5B and FIG. 5C.

Figure 5A:
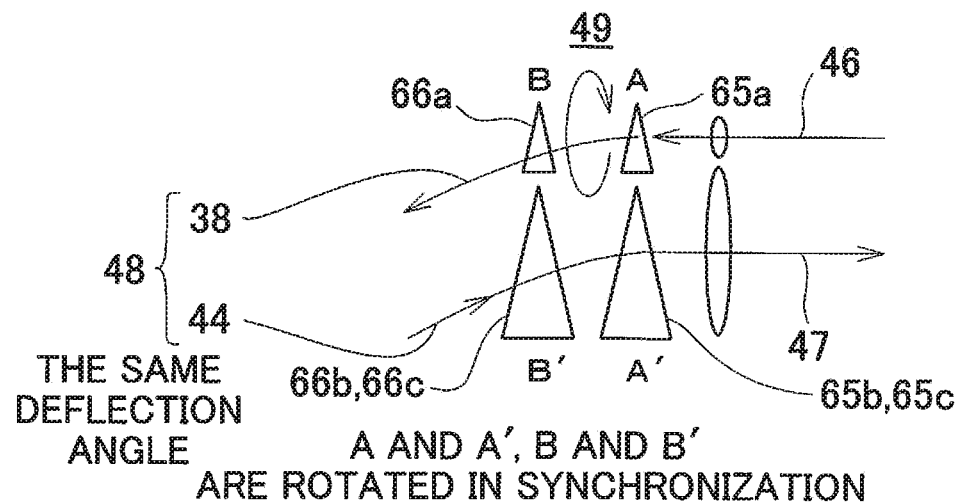
FIG. 5A, FIG. 5B and FIG. 5C are drawings to explain an action of the optical axis deflector.

It is to be noted that, in order to simplify an explanation, in FIG. 5A, the optical prisms 63 and 64 are shown by separating the triangular prisms 65a and 66a and the triangular prisms 65b, 65c, 66b and 66c. Further, FIG. 5A shows a condition where the triangular prisms 65a and 66a and the triangular prisms 65b, 65c, 66b and 66c are positioned in the same direction, and the maximum deflection angle (e.g. ±30°) is obtained in this condition. Further, the minimum deflection angle is obtained at a position where either one of the optical prisms 63 and 64 is rotated by 180°, mutual optical actions of the optical prisms 63 and 64 are offset, and the deflection angle becomes 0°. Therefore, the optical axis (the distance measuring optical axis 48) of the pulsed laser beam, as emitted and received through the optical prisms 63 and 64, coincides with the reference optical axis O.

The distance measuring light 46 is emitted from the light emitter 41, and the distance measuring light. 46 is turned to a parallel luminous flux by the projecting lens 42 and is emitted toward the object to be measured through the distance measuring light deflecting unit (the triangular prisms 65a and 66a here, by passing through the distance measuring light deflecting unit, the distance measuring light 46 is deflected by the triangular prisms 65a and 66a in a required direction and is emitted (FIG. 5A).

The reflected distance measuring light 47 reflected by the object to be measured is entered through the reflected distance measuring light deflecting unit and is focused on the photodetector 52 by the focusing lens 51.

When the reflected distance measuring light 47 passes through the reflected distance measuring light deflecting unit, an optical axis of the reflected distance measuring light 47 is deflected by the triangular prisms 65b and 65c and the triangular prisms 66b and 66c so as to coincide with the light receiving optical axis 44 (FIG. 5A).

By combining a rotational position of the optical prism 63 with the optical prism 64, a deflecting direction and a deflection angle of the distance measuring light 46 to be emitted can be arbitrarily changed.

Further, if the optical prism 63 and the optical prism 64 are integrally rotated by the motors 71 and 73 in a condition where the positional relationship between the optical prism 63 and the optical prism 64 is fixed (that is, in a condition where the deflection angle obtained by the optical prism 63 and the optical prism 64 is fixed), a locus drawn by the distance measuring light 46 passing through the distance measuring light deflecting unit becomes a circle around the reference optical axis O (see FIG. 3) as a center.

Therefore, when the optical axis deflector 49 is rotated while pulse-emitting the laser beam from the light emitter 41, the distance measuring light 46 can be scanned by the circular locus. It is to be noted that it is needless to say that the reflected distance measuring light deflecting unit rotates integrally with the distance measuring light deflecting unit.

Figure 5B:
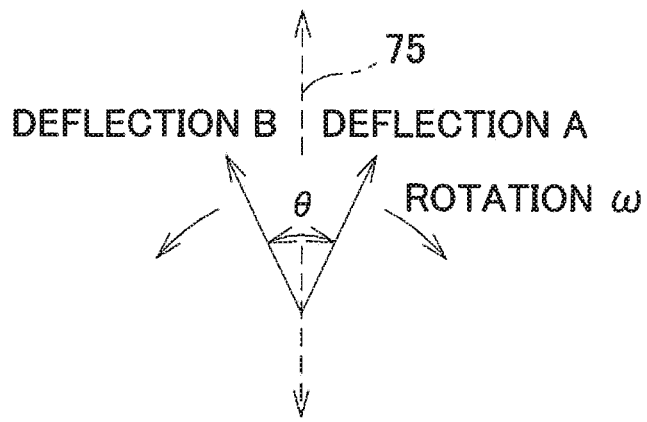

FIG. 5B shows a case where the optical prism 63 and the optical prism 64 are relatively rotated. Assuming that a deflecting direction of the optical axis deflected by the optical prism 63 is a deflection "A" and a deflecting direction of the optical axis deflected by the optical prism 64 is a deflection "B", the deflection of the optical axes by the optical prisms 63 and 64 becomes a synthetic deflection "C" as an angle difference "θ" between the optical prisms 63 and 64.

Therefore, in a case where the optical prism 63 and the optical prism 64 are synchronized in opposite directions and reciprocally rotated at an equal speed, the distance measuring light 46 passing through the optical prisms 63 and 64 is reciprocally scanned linearly. Therefore, by reciprocally rotating the optical prism 63 and the optical prism 64 in the opposite directions at the equal speed, as shown in FIG. 5E, the distance measuring light 46 can be made to reciprocally scan in a direction of the synthetic deflection C with a linear locus 75.

Figure 5C:
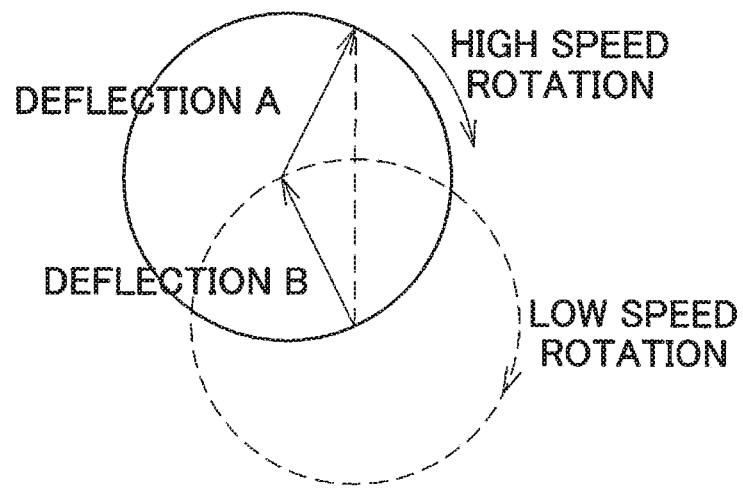

Further, as shown in FIG. 5C, when the optical prism 64 is rotated at a rotating speed lower than a rotating speed of the optical prism 63, the distance measuring light 46 is rotated while the angle difference e gradually increases. Therefore, the scan locus of the distance measuring light 46 becomes a spiral form.

Further, by individually controlling the rotating directions and the rotating speeds of the optical prism 63 and the optical prism 64, the scan locus of the distance measuring light 46 is performed in a radial direction (in the direction of a radius) with the reference optical axis O as the center, or is performed in the horizontal direction or in the vertical direction, or the like, and thereby, various two-dimensional scanning patterns can be obtained.

Furthermore, by synthesizing the horizontal scan and the vertical scan, a two-dimensional scan is made possible. Further, a two-dimensional closed loop scanning pattern with a center can be realized, and in this case, the center of the scanning pattern is coincided with the measuring point. Further, the center of the scanning pattern is coincided with the distance measuring optical axis 48.

Figure 6:
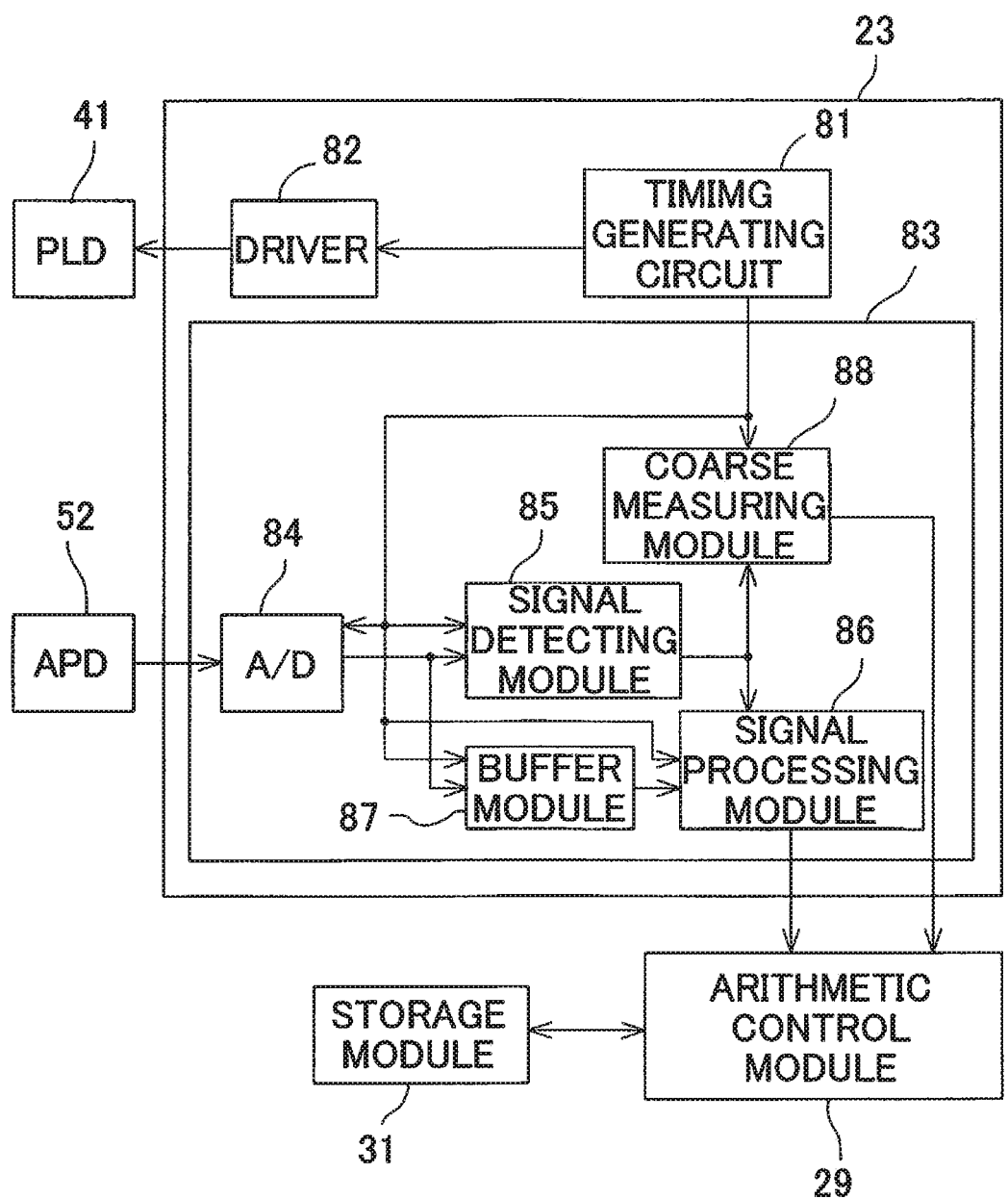
FIG. 6 is a configuration diagram of a distance measurement calculating unit shown in FIG. 3.

A description will be given on the distance measurement calculating unit 23 by referring to FIG. 6.

The distance measurement calculating unit 23 controls a light emission of the light emitter 41 and a light reception of the photodetector 52 and carries out the distance measurement.

The distance measurement calculating unit 23 mainly has a timing generating circuit 81, a driver 82 for making the light emitter 41 emit, and a light receiving signal processing module 83. Further, the light receiving signal processing module 83 has an A/D conversion module 64 for A/D converting a signal from the photodetector 52, a signal detecting module 85, a signal processing module 86, a buffer module 87 and a coarse measuring module 88.

The timing generating circuit 81 issues a timing signal to the driver 82, the A/D conversion module 84, the signal detecting module 85, the signal processing module 86, the buffer module 87 and the coarse measuring module 88, respectively.

The driver 82 makes the light emitter 41 emit in a combination of a pulsed light emission in a short cycle and a pause of a light emission according to the timing signal from the timing generating circuit 81. That is, the driver 82 carried out an intermittent light emission in which the light emitter 41 pulse-emits in the short cycle by a predetermined time (by a predetermined number of pulses) (group light emission) and then, pauses by a predetermined time. Therefore, each time the timing signal is input, the light emission (group light emission) in the short cycle and the pause of the light emission are alternately repeated. Here, a cycle, which includes one set of a time of pulse-emitting in the short cycle and a pausing time, is referred to as a long cycle.

From the timing generating circuit 81, one timing signal is issued per one long cycle. Further, it may be so configured that the driver 82 inputs a light emission driving signal for one long cycle to the light emitter 41 by an input of the timing signal or a light emission timing signal for one long cycle is output from the timing generating circuit 81 to the driver 82, and the driver 82 makes the light emitter 41 emit corresponding to the light emission timing signal.

To the A/D conversion module 84, the timing signal corresponding to the long cycle is input from the timing generating circuit 81, and the light receiving signal from the photodetector 52 is A/D converted in synchronization with the input of the timing signal.

To the signal detecting module 85, a timing signal corresponding to the long cycle t input from the timing generating circuit 81. The signal detecting module 85, in the light receiving signals as A/D converted by the A/D conversion module 84, detects a light receiving signal, which exceeds first a predetermined threshold value from a moment when the timing signal is input, as a first light receiving signal (to be described later) of the reflected distance measuring light. The first light receiving signal is input to the signal processing module 86 and the coarse measuring module 88.

The timing signal corresponding to the long cycle is input also to the buffer module 87 from the timing generating circuit 81. To the buffer module 87, the tight receiving signal as A/D converted by the A/D conversion module 84 is input, and the light receiving signals are accumulated per long cycle.

The coarse measuring module 88 measures the distance to the object to be measured based on the light receiving signal as input from the signal detecting module 85. To the coarse measuring module 88, the one first light receiving signal is input per long cycle. Further, since the distance measurement by the coarse measuring module 88 is a distance measurement based on the one first light receiving signal and is influenced by a photodetecting state of the photodetector 52, an accuracy is not high, and the distance measurement by the coarse measuring module 88 is a coarse distance measurement (coarse measurement).

To the signal processing module 86, the light receiving signal per one long cycle as accumulated in the buffer module 87 is input, and the signal processing module 86 measures the distance based on the accumulated light receiving signal for one long cycle and the light receiving signal from the signal detecting module 85.

A distance measurement result obtained by the signal processing module 86 is based on two or more of the light receiving signals of the distance measuring light emitted (group-emitted by the predetermined number of pulses) by the predetermined time in the short cycle, and the photodetecting state is averaged or noises or the like is offset and hence, a measurement accuracy is high. Therefore, a precise measurement is carried out in the signal processing module 86.

A coarse measurement result from the coarse measuring module 88 and a precise measurement result from the signal processing module 86 are input to the arithmetic control module 29. The arithmetic control module 29 associates these measurement results with a positional information acquired by the GNSS device 9 and stores these measurement results in a storage module 31.

Hereinafter, a description will be given on a measurement operation in the present embodiment by referring to FIG. 7, FIG. 8, FIG. 9 and FIG. 10.

Figure 7:
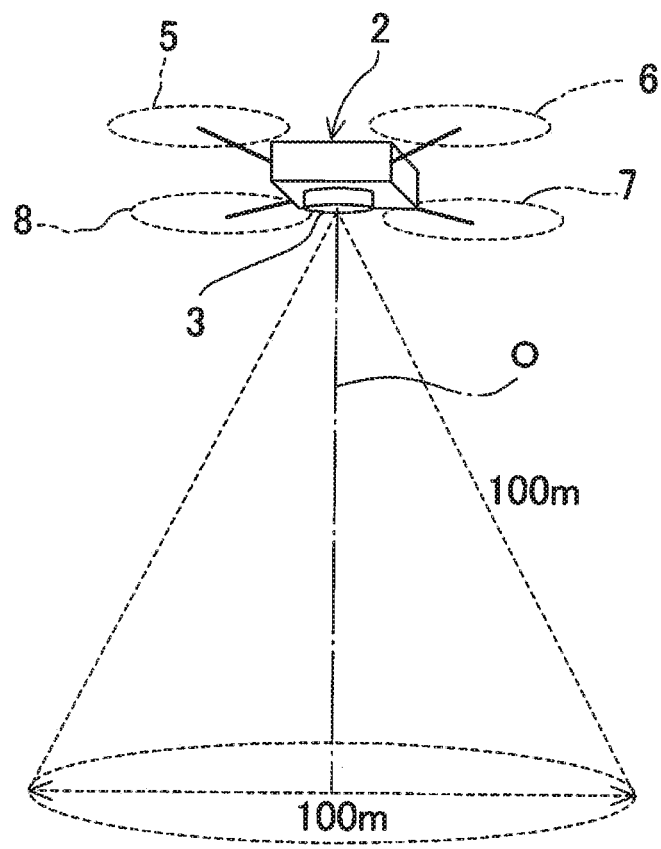
FIG. 7 is an explanatory drawing to show a measurement state in the first embodiment.

FIG. 7 shows a state where the laser scanner 3 is provided on a lower surface of the unmanned aerial vehicle 2, circularly scans around the reference optical axis O extending vertically downward and performs a measurement of a ground surface.

Here, in a case where the group light emission is carried out once in one circular scanning, one round of the circular scanning is the long cycle, and in a case where the group light emissions are carried out for two or more times ("n" times) in one circular scanning, 1/n of the cycle of the circular scanning becomes the long cycle. The pulsed light emission (group light emission) in the short cycle is carried out with a predetermined arc length (predetermined angle) along a circumference of the circular scanning, and the distance measurement is carried out per each pulsed light.

Figure 8:
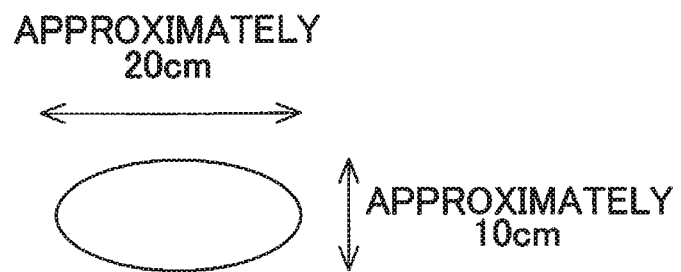
FIG. 8 is an explanatory drawing to show a beam diameter of a distance measuring light.

Further, FIG. 7 exemplifies that a distance to be measured is 100 meters, and if the distance to be measured becomes 100 meters, the beam diameter of the distance measuring light becomes 20 cm at the maximum. It is to be noted that a luminous flux section of the laser beam usually has an elliptic shape, and FIG. 8 shows that a major axis of the luminous flux section is 20 cm.

Figure 9:
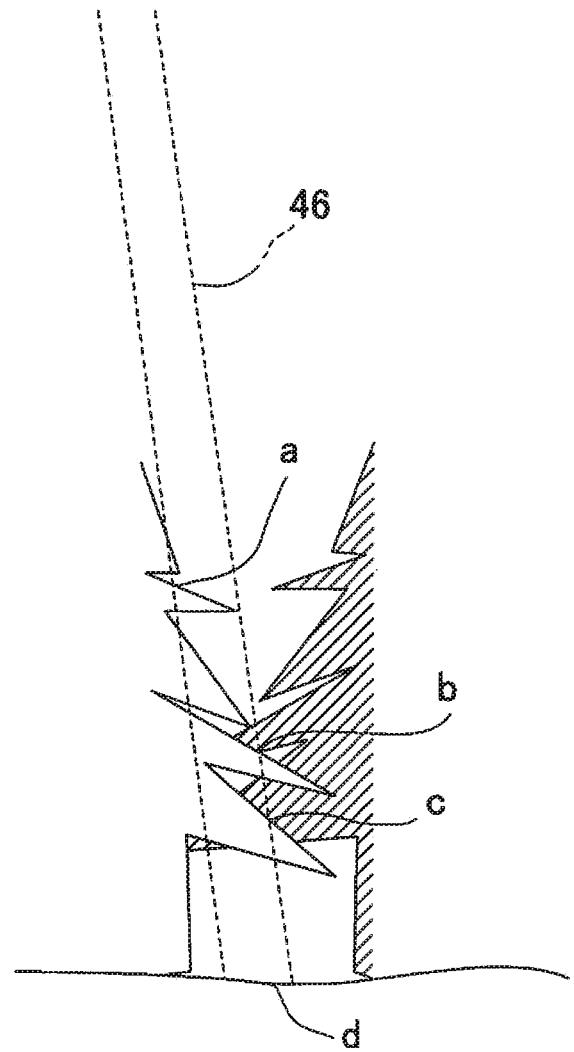
FIG. 9 is an explanatory drawing to show a relationship between the distance measuring light and a measuring point of a case where an object to be measured is a ground surface and trees are existed at a measuring position.

FIG. 9 shows a state where one pulsed light (the distance measuring light 46) is irradiated to the ground surface. Further, FIG. 9 shows a case where an irradiating position is woods. As described above, since the distance measuring light 46 has some or certain beam diameters, a part of the distance measuring light 46 reaches the ground surface while being partially blocked by trees. Therefore, as the reflected distance measuring light, a reflected distance measuring light reflected by leaves of the trees and a reflected distance measuring light reflected by the ground surface enter the photodetector 52.

Figure 10:
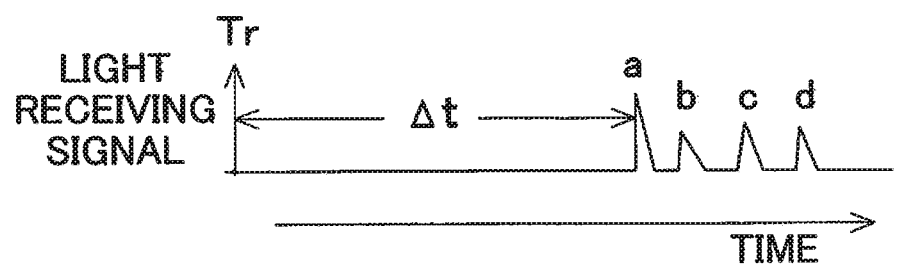
FIG. 10 is an explanatory drawing to show a light receiving signal of a case where an irregularity is existed such as a case where trees are existed at the measuring position.

In FIG. 9, reflecting positions a, b, c and d of the distance measuring light 46 are shown. Therefore, the light receiving signal produced from the photodetector 52 becomes a plurality of light receiving signals a, b, c and d as shown in FIG. 10. Further, the light receiving signals a, b and c are made by the reflected distance measuring light reflected by the leaves of the trees, and the light receiving signal d is made by the reflected distance measuring light reflected by the ground surface.

Further, in FIG. 10, a signal Tr is a timing signal (a trigger signal of the light emission) issued at a starting point of the long cycle.

The first light receiving signal as detected at first by the signal detecting module 85 from a start of the long cycle becomes the light receiving signal a, and a distance to a reflecting position a is measured by the light receiving signal a. It is to be rioted that a distance to the reflecting position a from the ground surface (a height from the ground surface) is extremely small compared to the distance to the reflecting position a as measured by the laser scanner 3. As a result, an approximate distance to the ground surface can be known by a distance measurement to the reflecting position a. Thus, the coarse measuring module 88 can carry out the coarse measurement to the ground surface by a single pulsed light.

As described above, when the distance measuring light 46 (the distance measuring optical axis 48) is deflected at a required angle by the optical prisms 63 and 64 and the optical prisms 63 and 64 are rotated integrally by the motor 71 and the motor 73, the circular scanning can be carried out. Further, while the circular scanning is carried out, the unmanned aerial vehicle 2 flies, the pulsed light emission is performed in a process of the circular scanning (along a locus of the circular scanning), and the measurement is performed.

When the cycle of the pulsed light emission is made sufficiently short with respect to a rotating speed of this circular scanning, that is, when the cycle of the pulsed light emission is made a short cycle with a sufficiently short light emission interval time with respect to a peripheral velocity of the circular scanning, the pulsed light emission is carried out for a plurality of times until all luminous fluxes of the distance measuring light 46 pass the measuring point P. That is, the pulsed light is multiply irradiated in the short cycle with respect to the measuring point P. It is to be noted that the measurement situation is considered regarding the number of times of the pulsed light emission, and an optimum number of times is selected.

Figure 11:
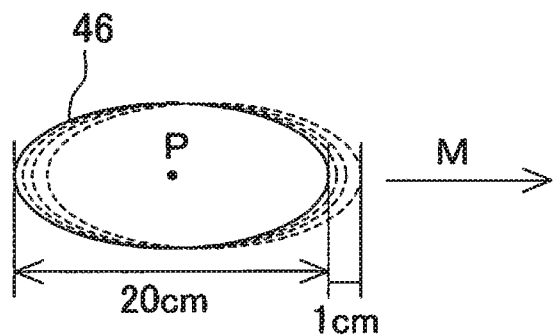
FIG. 11 is an explanatory drawing of a case where the measuring point is multiply irradiated with the distance measuring light.

FIG. 11 shows a moving state of the distance measuring light 46 with respect to the measuring point P when the distance measuring light 46 is multiply irradiated to the measuring point P.

In FIG. 11, a luminous flux diameter of the distance measuring light 46 is 20 cm (see FIG. 8). Further, in FIG. 11, an arrow mark P indicates a moving direction of the luminous flux (a scanning direction of the distance measuring light 46).

In FIG. 3 and FIG. 4, assuming that a rotating speed of the optical axis deflector 49 is 30 rotations per second and a diameter of the circular scanning is 100 meters (see FIG. 7), the peripheral velocity of the circular scanning is approximately 300 meters per second×30 rotations=9000 meters/sec. Further, assuming that a light emission interval of the pulsed light is 300 nsec, a laser beam movement deviation by the scanning speed is 9000 meters×300 nsec=2.7 mm, and a luminous flux deviation of approximately 1 cm is caused in four times of the pulsed light emission.

Therefore, the measuring point P is included in the luminous fluxes of all of the pulsed lights as irradiated in four times of the pulsed light emission, and the reflected distance measuring light from the measuring point P is received for each pulsed light (pulsed distance measuring light). Further, a luminous flux deviation of 1 cm is a slight deviation with respect to a beam size of 10 cm×20 cm and the distance measurement by multiply irradiating is substantially equal to four times of the distance measurement at the same position. In the following explanation, a description of a case where the number of the time of the pulsed light emission is set to four will be given.

Figure 12A:
FIG. 12A and FIG. 12B are explanatory drawings to show the light receiving signal in a case where the measuring point is multiply irradiated.
Figure 12B:
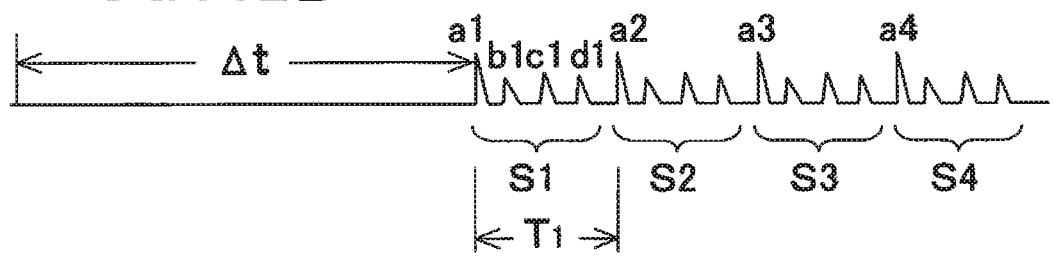

FIG. 12A and FIG. 12B show a relationship between the light emission timing of the distance measuring light 46 and the light receiving signals a, b, c and d.

FIG. 12A shows that trigger signals Tr1, Tr2, Tr3 and Tr4 for pulse-emitting the distance measuring light are issued in a short cycle 11, and the distance measuring light 46 is pulse-emitted.

FIG. 12B shows the light receiving signal (see FIG. 9 and FIG. 10) acquired by receiving the reflected distance measuring light of each pulsed light, and suffixes (1 to 4) of the light receiving signals (a to d) correspond to suffixes (1 to 4) of the trigger signals Tr.

Regarding a pulsed light as emitted by the first trigger signal Tr1, for instance, a light receiving signal a1 (first light receiving signal), which is caused by the reflected distance measuring light as received at first, corresponds to the light receiving signal a as shown in FIG. 10. A time Δt from a light emission timing of the trigger signal Tr1 until the light receiving signal a1 is issued, is a time required for the coarse measurement. Further, a light receiving signal group (light receiving signals (a1, b1, c1, d1)) S1 is acquired by the pulsed light emitted by the trigger signal Tr1.

Further, since the light receiving signals, which are caused by the reflected distance measuring light of the pulsed light as emitted by the trigger signals Tr2, Tr3 and Tr4, are issued, a light receiving signal group S2 (light receiving signals (a2, b2, c2, d2)) to a light receiving signal group S4 (light receiving signals (a4, b4, c4, d4)), which correspond to the pulsed lights as emitted by the trigger signals Tr2, Tr3 and Tr4, are acquired. Further, a time interval between these light receiving signal groups is equal to an issue interval of the trigger signal Tr and becomes a short cycle T1.

The light receiving signal group S1 (light receiving signals (a1, b1, c1, d1)) to the light receiving signal group S4 (light receiving signals (a4, b4, c4, d4)) are stored in the buffer module 87.

Here, the short cycle T1 need to be set such that the light receiving signal groups are not overlapped. The short cycle T1 may be set corresponding to a measurement environment, but in a case where the object to be measured is a forest, woods or the like, assuming that a height of trees is 30 meters or less, a distance measuring time of 30 meters by the laser beam is 200 nsec and hence, the short cycle T1 only needs to be set to 200 nsec. That is, the short cycle T1 is set to the distance measuring time difference or more corresponding to a difference of an irregularity of the object to be measured.

Thus, the light receiving signal corresponding to the pulsed light as emitted in the short cycle can be acquired in a separated state, and the signal detecting module 85 detects the first light receiving signal a1 as detected at first from the trigger signal Tr1 issued at the starting point of the long cycle. The coarse measuring module 88 carries out the coarse measurement based on the first light receiving signal a1.

Further, regarding the light receiving signal group S1 (light receiving signals (a1, b1, c1, d1)) to the light receiving signal group S4 (light receiving signals (a4, b4, c4, d4)) as stored in the buffer module 87, each of the light receiving signal group S1 to the light receiving signal group S4 is advanced sequentially by the short cycle T1, and all of the light receiving signal group S1 to the light receiving signal group 34 are overlapped and integrated. Thereby, the overlapped and integrated receiving signal is acquired. By being integrated the light receiving signals by the reflected distance measuring lights from each of the reflecting positions a, b, c and d (see FIG. 9), a size of the light receiving signal corresponding to each of the reflecting positions becomes four times. Further, by integrating, a noise component is offset, and a light receiving signal with a large S/N is acquired. Therefore, a measurement result with high accuracy is obtained in a scanning measurement.

Further, the distance measurement of each of the reflecting positions a, b, c and d can be performed based on the integrated light receiving signals as integrated, and the distance measurement of a plurality of positions can be carried out at the same time by one distance measuring beam (or a distance measuring beam which can be regarded as one), and an information of a complicated ground surface can be acquired easily.

Figure 13:
FIG. 13 is an explanatory drawing to show an integrated light receiving signal of a case where the light receiving signals as multiply irradiated are integrated.

FIG. 13 shows light receiving signals in a state where the light receiving signal group S1 to the light receiving signal group S4 are integrated.

Figure 14:
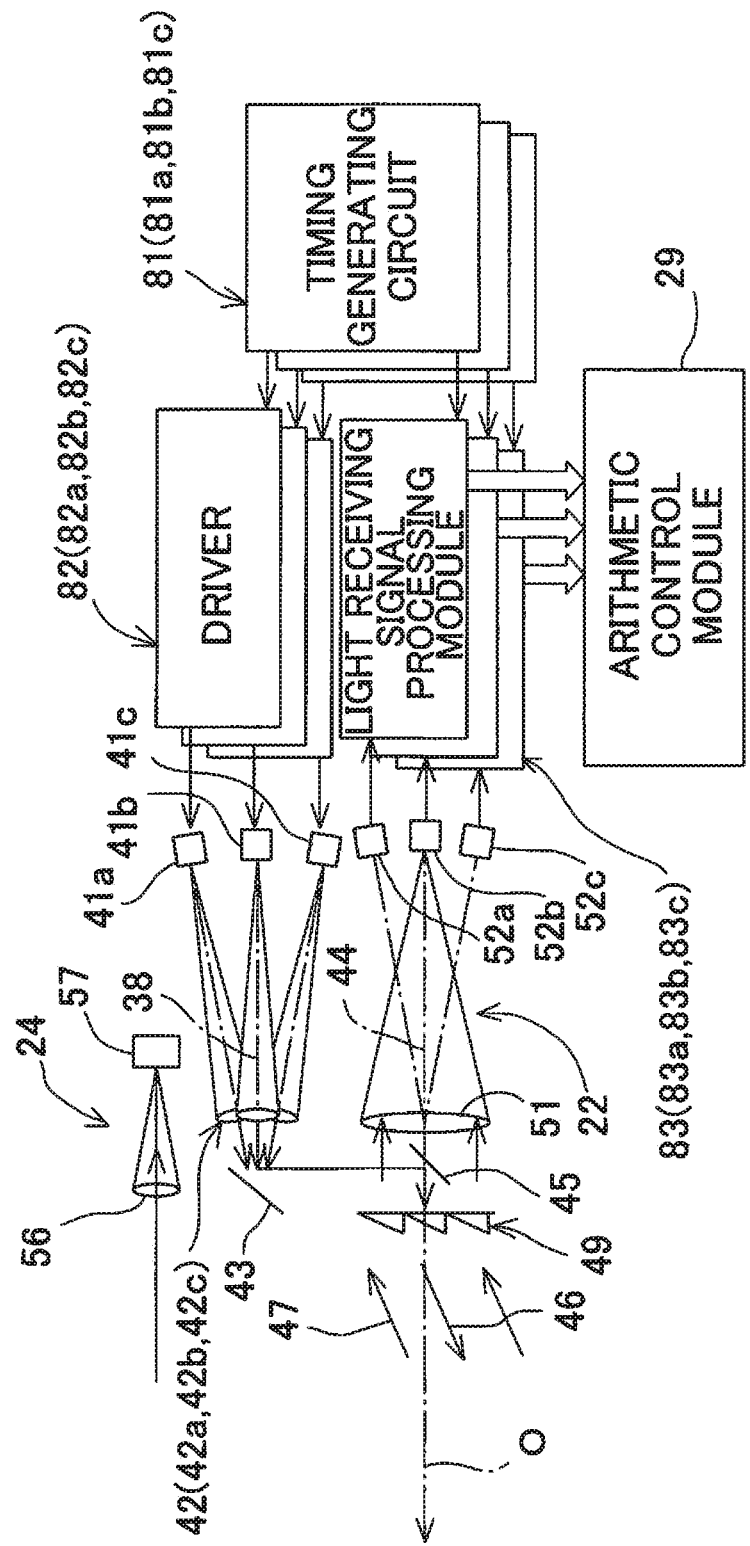
FIG. 14 is a configuration diagram to show a second embodiment and of a case where a laser scanner has a plurality of light emitters and comprises photodetectors in the same number corresponding to the light emitters, and distance measurements of a plurality of points are performed at the same time.

FIG. 14 shows a second embodiment, and in the second embodiment, a laser scanner 3 has a plurality of light emitters 41 and irradiates a plurality of laser beams (distance measuring lights 46) and can measure a plurality of points at the same time. It is to be noted that in the figure, three of the light emitters 41 are included, but it is needless to say that two or more points can be measured at the same time also by two of the light emitters 41 or four or more of the light emitters 41.

In the following embodiment, a description will be given by assuming that the number of light emitters 41 is three. Further, in FIG. 14, components equivalent to components as shown in FIG. 3 and FIG. 6 are referred by the same symbols, and a detailed description thereof will be omitted.

Three of the light emitters 41*a*, 41*b* and 41*c* and projecting lenses 42*a*, 42*b* and 42*c* provided corresponding to the light emitters 41*a*, 41*b* and 41*c* are disposed with reference to a projection optical axis 38 (center).

The light emitters 41*a*, 41*b* and 41*c* are disposed in a circumferential direction with the projection optical axis 38 as a center at an equal angular pitch, for instance, a 120° pitch. An optical axis of each of the light emitters 41*a*, 41*b* and 41*c* is positioned at a position tilted with respect to the projection optical axis 38 at a predetermined angle, for instance, 15°. That is, each of the light emitters 41*a*, 41*b* and 41*c* is arranged at an apex of a triangle with the projection optical axis 38 as the center, and the light emitters 41*a*, 41*b* and 41*c* are conjugated in relation with photodetectors 52*a*, 52*b* and 52*c* (to be described later). Further, the projecting lenses 42*a*, 42*b* and 42*c* are provided on the optical axes of the light emitters 41*a*, 41*b* and 41*c*, respectively.

The projection optical axis 38 is deflected by a first reflection mirror 43 as a deflecting optical component as provided on the projection optical axis 38 and a second reflection mirror 45 as a deflecting optical component as provided on a light receiving optical axis 44 so as to coincide with the light receiving optical axis 44. A pulsed laser beam emitted from each of the light emitters 41*a*, 41*b* and 41*c* is deflected by the first reflection mirror 43 and the second reflection mirror 45, further deflected by an optical axis deflector 49, respectively, and emitted as the distance measuring light 46 (46*a*, 46*b*, 46*c*).

Next, a description will be given on a light receiving unit 22. To the light receiving unit 22, a reflected distance measuring light 47 (47*a*, 47*b*, 47*c*) reflected by an object to be measured (that is, a measuring point) enters. The light receiving unit 22 has the light receiving optical axis 44. With the light receiving optical axis 44, the projection optical axis 38 deflected by the first reflection mirror 43 and the second reflection mirror 45 is coincided.

The reflected distance measuring light 47 passes through the optical axis deflector 49 and enters onto the light receiving optical axis 44. On the light receiving optical axis 44, that is, on a reference optical axis O, a focusing lens 51 is disposed. Further, three of photodetectors 52*a*, 52*b* and 52*c*, for instance, avalanche photodiodes (APD) are provided on the optical axis tilted at a predetermined angle from the light receiving optical axis 44, for instance, 15°, and in the circumferential direction at an equal angular pitch, that is, at a 120° pitch position. That is, the photodetectors 52*a*, 52*b* and 52*c* are disposed in an equilateral triangle shape with the light receiving optical axis 44 as the center.

A position of the light emitter 41*a* is at a position conjugated with the photodetector 52*a* in relation with the projecting lens 42*a* and the focusing lens 51. Similarly, positions of the light emitters 41*b* and 41*c* are at positions conjugated with the photodetectors 52*b* and 52*c* respectively in relation with the projecting lenses 42*b* and 42*c* and the focusing lens 51. Therefore, the distance measuring light. 46*a* emitted from the light emitter 41*a* is received by the photodetector 52*a*. Further, the distance measuring light 46*b* emitted from the light emitter 41*b* is received by the photodetector 52*b*. Further, the distance measuring light 46*c* emitted from the light emitter 41*c* is received by the photodetector 52*c*.

The photodetectors 52*a*, 52*b* and 52*c* generate light receiving signals, respectively. Each of the light receiving signals is input to light receiving signal processing modules 83*a*, 83*b* and 83*c*, respectively. The light receiving signal processing modules 83*a*, 83*b* and 83*c* perform a distance measurement to the measuring point based on the light receiving signals, respectively.

Figure 15:
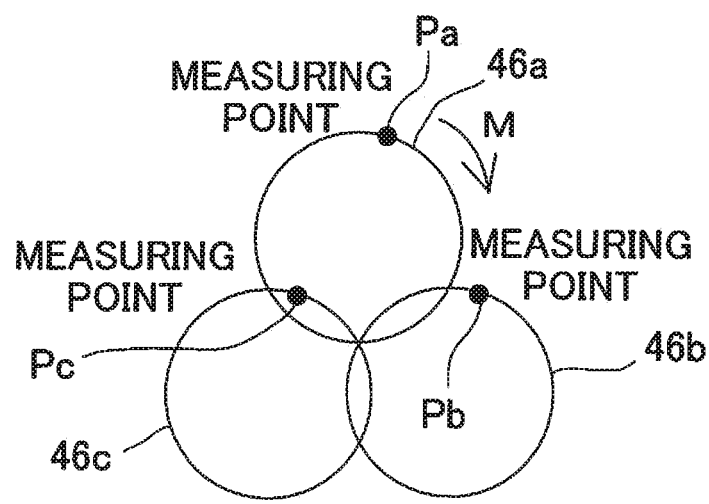
FIG. 15 is an explanatory drawing to show a relationship between a scanning locus and the measuring point in the second embodiment.

FIG. 15 shows a relationship between a scan locus of each of the distance measuring lights 46*a*, 46*b* and 46*c* as emitted from the laser scanner 3 and measuring points Pa, Pb and Pc.

In the second embodiment, timing signals for a light emission is issued from timing generating circuits 81*a*, 81*b* and 81*c* to drivers 82*a*, 82*b* and 82*c* at the same time, and the light emitters 41*a*, 41*b* and 41*c* are emitted at the same timing by the drivers 82*a*, 82*b* and 82*c*.

In a light emission mode of each of the light emitters 41*a*, 41*b* and 41*c*, similarly to the above, a pulsed light is emitted in a long cycle including a pulsed light emission in a short cycle, and in the pulsed light emission in the short, cycle, the pulsed light is multiply irradiated with respect to the measuring points Pa, Pb and Pc. It is to be noted that since a processing of light receiving signals acquired by a multiple irradiation is similar to the embodiment as described above, a description thereof will be omitted.

Figure 16:
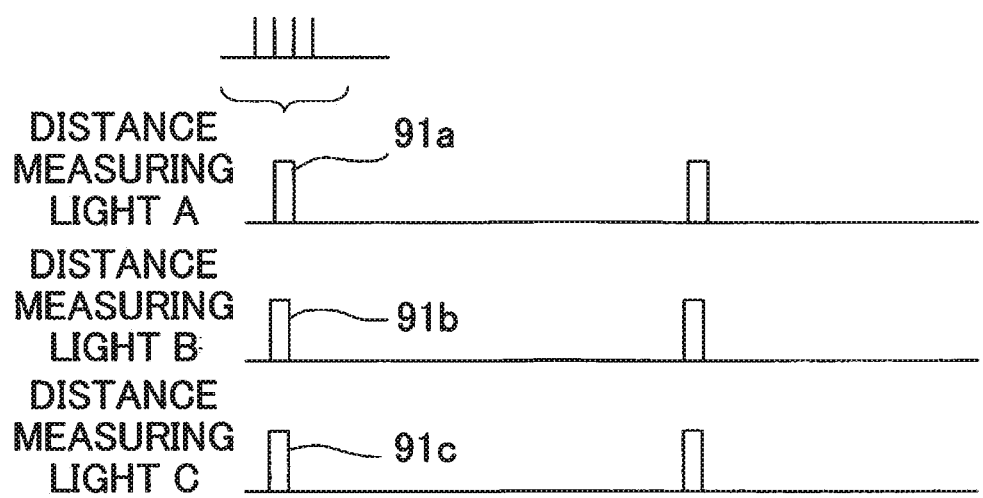
FIG. 16 is an explanatory drawing to show light receiving signals in the second embodiment.

FIG. 16 shows a light emission timing of each of the distance measuring lights 46*a*, 46*b* and 46*c*. Further, rectangular waves 91*a*, 91*b* and 91*c* in each of the distance measuring lights show pulsed light groups emitted in the short cycle, respectively, and each of the rectangular waves 91*a*, 91*b* and 91*c* includes four pulsed lights, respectively.

Thus, in the second embodiment, a measurement can be carried out at the same time for the measuring points Pa, Pb and Pc.

Figure 17:
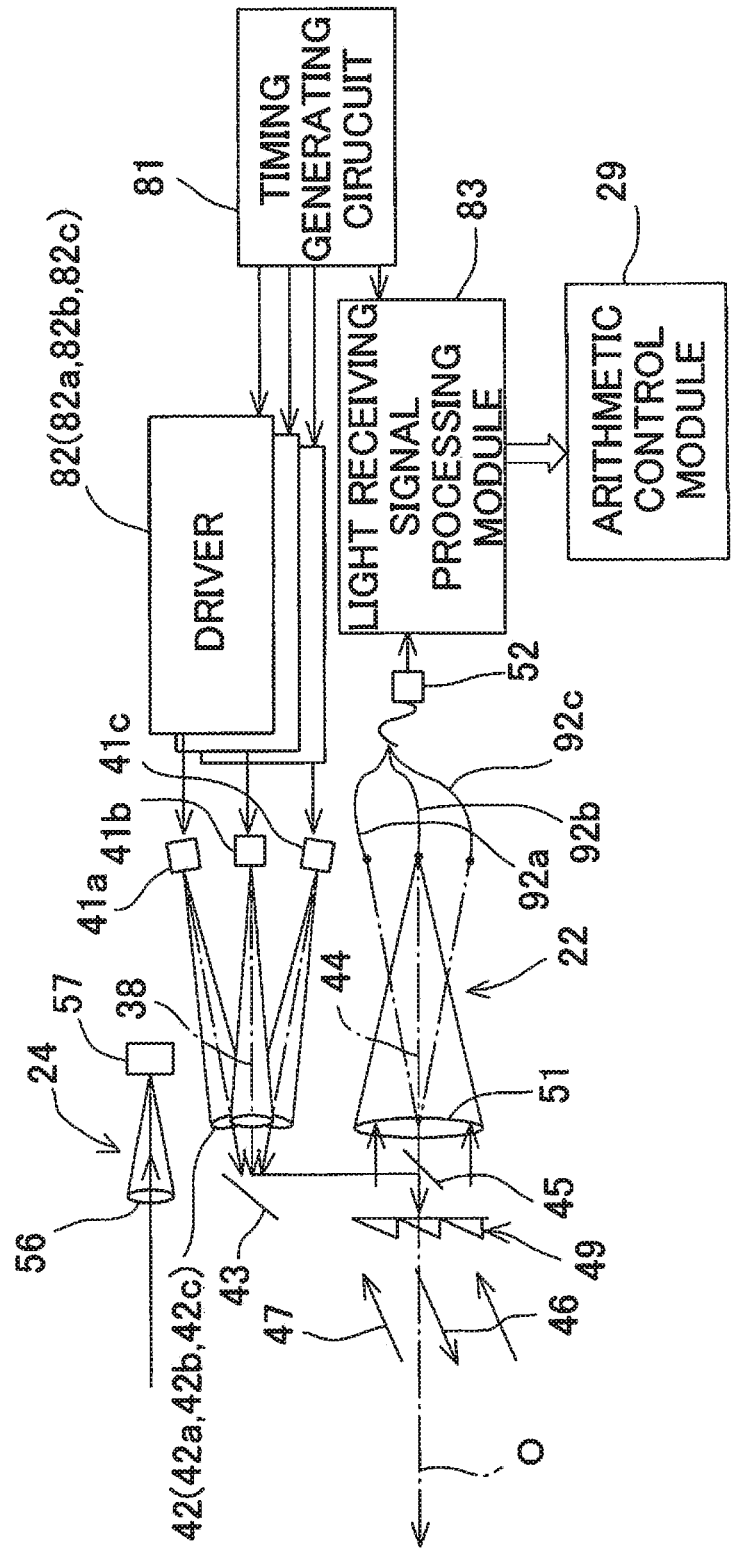
FIG. 17 is a configuration diagram to show a third embodiment and of a case where a laser scanner has a plurality of light emitters and comprises one photodetector, and distance measurements of a plurality of points are performed at the same time.

FIG. 17 shows a third embodiment, and in the third embodiment, similarly to the second embodiment, the laser scanner 3 has a plurality of light emitters 41, irradiates a plurality of laser beams (distance measuring lights 46), and can measure a plurality of points at the same time. It is to be noted that, in the figure, a case where three of the light emitters 41 are comprised is shown.

Further, in FIG. 17, components equivalent to components as shown FIG. 14 are referred by the same symbols, and a detailed description thereof will be omitted.

Three of the light emitters 41a, 41b and 41c are disposed similarly to the second embodiment with reference to a projection optical axis 38. In the third embodiment, there is one photodetector 52, and it is so configured that reflected distance measuring lights corresponding to the light emitters 41a, 41b and 41c are received by optical fibers 92a, 92b and 92c, respectively, and reflected distance measuring lights 47a, 47b and 47c are led to the photodetector 52 by the optical fibers 92a, 92b and 92c. The reflected distance measuring lights 47a, 47b and 47c are received by the photodetector 52.

It is to be noted that light receiving end surfaces of the optical fibers 92a, 92b and 92c are conjugated with the light emitters 41a, 41b and 41c in relation with projecting lenses 12a, 42b and 42c and a focusing lens 51.

Further, one timing generating circuit 81 inputs light emission timings to drivers 82a, 82b and 82c of the light emitters 41a, 41b and 41c so that the distance measuring lights 46a, 46b and 46c as emitted from the light emitters 41a, 41b and 41c are emitted at a predetermined time difference.

It is to be noted that, similarly to the second embodiment, timing signals input to each of the drivers 82a, 82b and 82c are set to a timing to emit each of the light emitters 41a, 41b and 41c in the long cycle including a pulsed light emission in the short cycle, and in the pulsed light emission in the short cycle, the timing signals input to each of the drivers 82a, 82b and 82c are set to a timing to multiply emit a pulsed light with respect to measuring points Pa, Pb and Pc.

Figure 18:
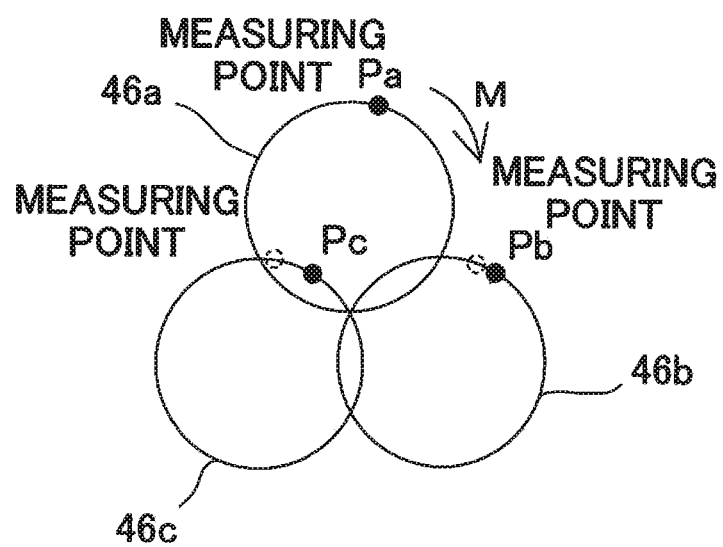
FIG. 18 is an explanatory drawing to show a relationship between a scanning locus and a measuring point in the third embodiment.

FIG. 18 shows a relationship between a scanning locus of each of the distance measuring lights 46a, 46b and 46c and the measuring points Pa, Pb and Pc in the third embodiment. There is a time deviation in the light emission timing of the light emitters 41a, 41b and 41c, the laser scanner 3 is mounted on an unmanned aerial vehicle 2, and the unmanned aerial vehicle 2 is flying. Therefore, a position measured by each of the distance measuring lights 46a, 46b and 46c is displaced for the time difference of the light emission timing.

On the other hand, a measuring timing of the distance measuring lights 46a, 46b and 46c extremely faster than a flying speed of the unmanned aerial vehicle 2. Further, a moving amount of the unmanned aerial vehicle 2 corresponding to the time deviation in the light emission timing of the light emitters 41a, 41b and 41c becomes extremely small, and an effect of a substantially simultaneous measurement can be obtained.

Figure 19:
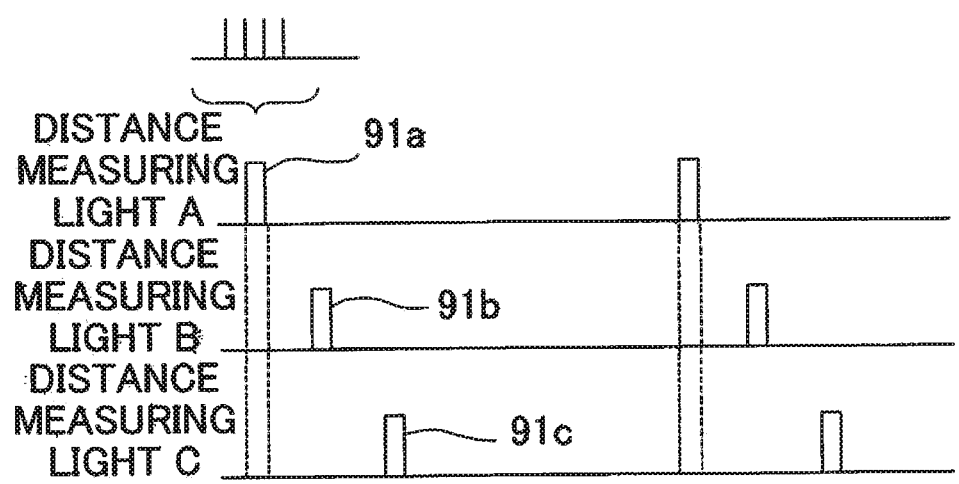
FIG. 19 is an explanatory drawing to show light receiving signals in the third embodiment.

FIG. 19 shows the light emission timing of each of the distance measuring lights 46a, 46b and 46c in the third embodiment. Further, rectangular waves 91a, 91b and 91c in each of the distance measuring lights show a pulsed light group emitted in the short cycle, respectively, and the rectangular waves 91a, 91b and 91c include four pulsed lights, respectively. In the third embodiment, the light emission timing is shifted in time so that the reflected distance measuring lights from the measuring points Pa, Pb and Pc do not enter the photodetector 52 while being overlapped.

Figure 20:
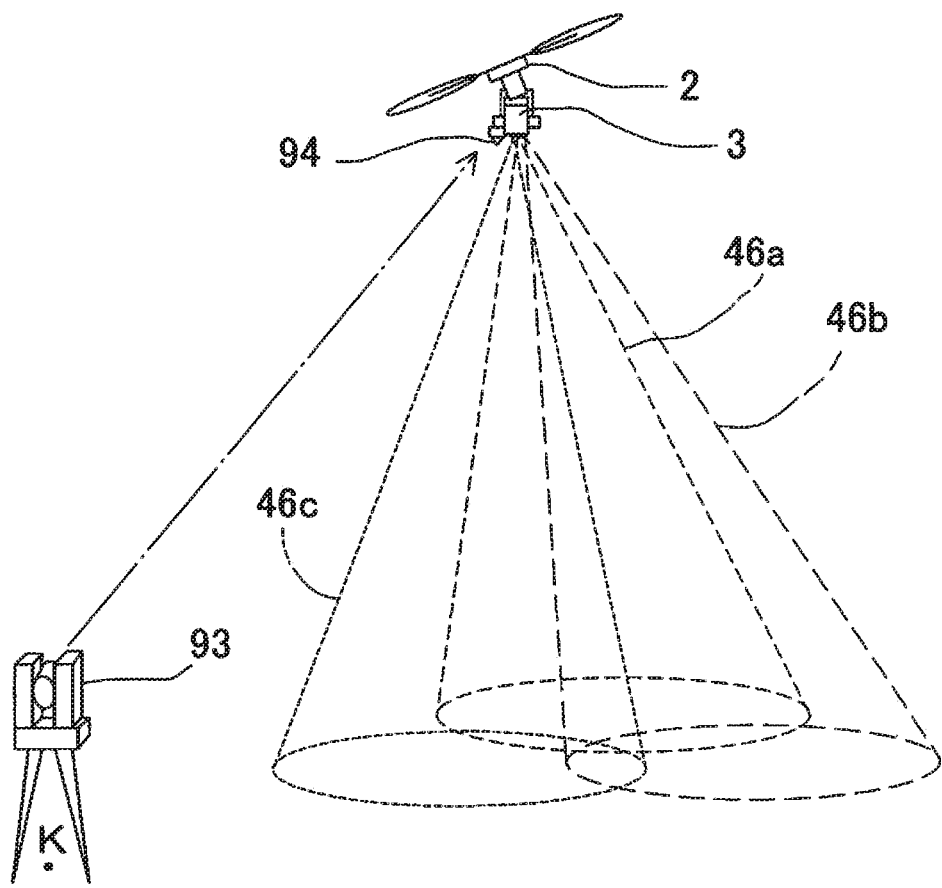
FIG. 20 is a system schematical drawing to show a fourth embodiment.

FIG. 20 shows a fourth embodiment. In the first embodiment, a position of an unmanned aerial vehicle 2 is measured by a GNSS device 9, but in the fourth embodiment, a reference position of the unmanned aerial vehicle 2 or a measurement reference point of a laser scanner 3 is measured by a total station 93.

The total station 93 is installed on a known point (a point at which three-dimensional coordinates are known) while being given an azimuth, and a reflector (a prism, for instance) 94 having an optical action of a retro-reflection is provided on the unmanned aerial vehicle 2. The reflector 94 is provided at a known position with respect to the reference position of the unmanned aerial vehicle 2 or the measurement reference point of the laser scanner 3.

The total station 93 performs a position measurement of the reflector 94 while tracking the reflector 94. The position of the unmanned aerial vehicle 2 is measured by the total station 93, and by associating a result measured by the laser scanner 3 with the position of the unmanned aerial vehicle 2 measured by the total station 93, the result measured by the laser scanner 3 can be converted to a geocentric coordinate system (absolute coordinates).

Figure 21:
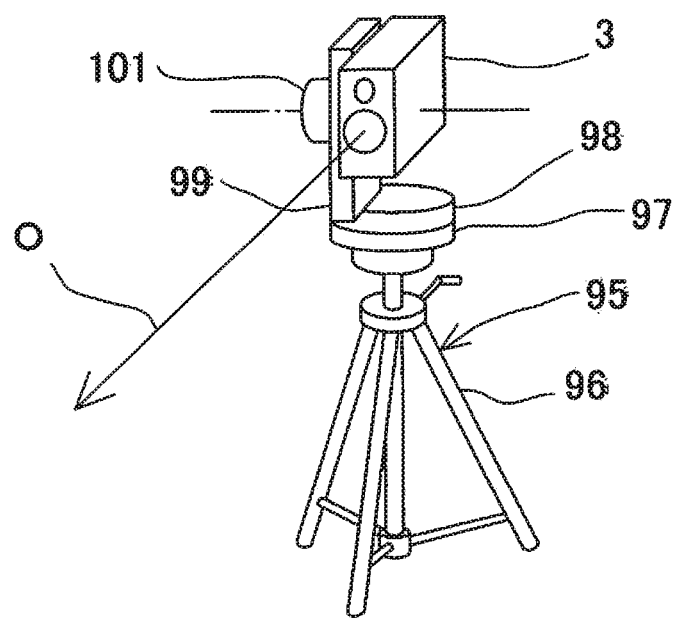
FIG. 21 is a system schematical drawing to show a fifth embodiment.

FIG. 21 shows a fifth embodiment.

The fifth embodiment shows a case where the laser scanner 3 explained in FIG. 3 and FIG. 4 is installed on an immovable body such as the ground, a structure or the like.

The laser scanner 3 is installed at a known point (known three-dimensional coordinates) on a ground surface via an installation device 95.

The installation device 95 mainly has a tripod 96, an in base 97 provided on an upper end of the tripod 96, a base unit 98 provided on the installation base 97, and a frame unit 99 provided on the base unit 98, and the laser scanner 3 is provided on the frame unit 99.

The base unit 98 is rotatable with a vertical axis as a center with respect to the installation base 97, and a rotation angle of the base unit 98 with respect to the installation base 97 can be detected by a horizontal angle detector (not shown).

Further, the laser scanner 3 is rotatable with a horizontal axis as the center with respect to the frame unit 99, and a rotation angle of the laser scanner 3 in a vertical direction with respect to the frame unit 99 can be detected by a vertical angle detector (not shown). Further, the base unit 98 is rotated in a horizontal direction by a horizontal motor (not shown) as built in the base unit 98, and the laser scanner 3 is rotated in the vertical direction by a vertical motor 101.

A distance measuring light 46 as emitted from the laser scanner 3 is circularly scanned with the reference optical axis O as the center.

Also in the fifth embodiment, a pulsed light emission in a short cycle of the distance measuring light 46 is carried out with a predetermined arc length (predetermined portion) along a circumference of a circular scanning by the laser scanner 3, and a distance measurement is carried out per each pulsed light. Further, the distance measuring light 46 is multiply irradiated by the laser scanner 3 so that luminous fluxes of the pulsed lights are overlapped at a measuring point, the distance measurement is carried out based on a light receiving signal acquired by a multiple irradiation, and a horizontal angle and a vertical angle of the measuring point is detected by the horizontal angle detector (not shown) and the vertical angle detector (not shown), respectively. Further, by rotating the laser scanner 3 in the horizontal direction or in the vertical direction by the horizontal motor (not shown)

or the vertical motor 101, the laser scanner 3 can acquire point cloud data within a required measurement range.

It is to be noted that when a deflected angle amount of a distance measuring optical axis 48 in the laser scanner 3 is sufficiently large with respect to the measurement range, the vertical motor 101 and the vertical angle detector can be omitted. Further, in this case, the laser scanner 3 functions as a total station.

Figure 22:
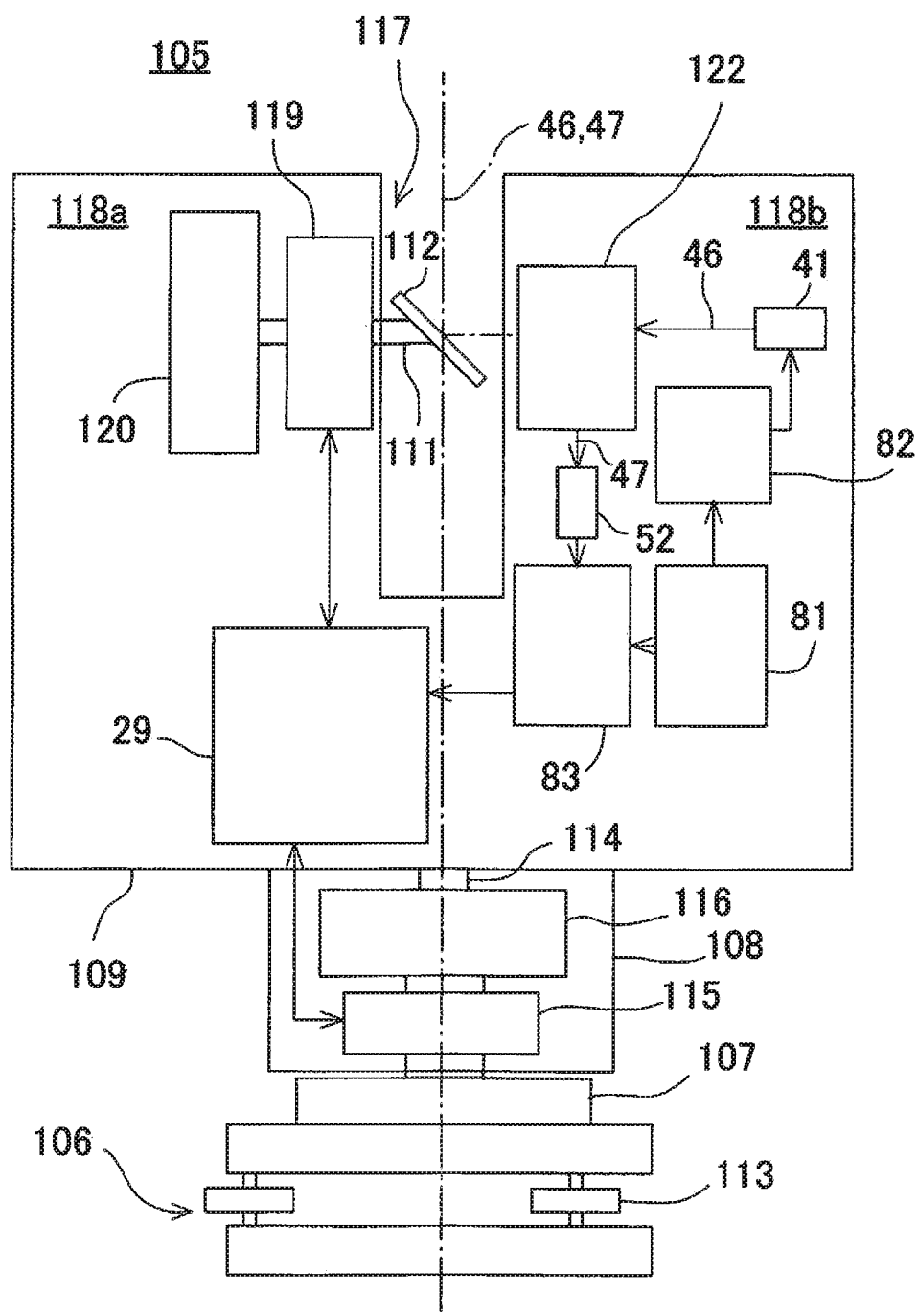
FIG. 22 a schematical block diagram of a laser scanner accordion to a sixth embodiment.

FIG. 22 shows a sixth embodiment.

The sixth embodiment is a case where the present invention is put into practice in a general laser scanner.

In FIG. 22, reference numeral 105 denotes a laser scanner. The laser scanner 105 is installed at a known point via a tripod (not shown). It is to be noted that in FIG. 22, components equivalent to components as shown in FIG. 3 and FIG. 6 are referred by the same symbols, and a detailed description thereof will be omitted.

A description of a general configuration of the laser scanner 105 will be given. The laser scanner 105 has a leveling unit 106 mounted on the tripod, a base unit 107 provided on the leveling unit 106, a frame unit 109 provided on the base unit 107 rotatably in a horizontal direction via a horizontal rotary unit 108, and a scanning mirror 112 provided on the frame unit 109 rotatably in a vertical direction (high-and-low direction) around a vertical rotation shaft 111 as a center.

The leveling unit 106 has three adjusting screws 113, for instance, and the base unit 107 is leveled by adjusting the adjusting screws 113.

The horizontal rotary unit 108 has a horizontal rotation shaft 114 supported rotatably and vertically by the base unit 107. The frame unit 109 is supported by the horizontal rotation shaft 114, and the frame unit 109 is rotated integrally with the horizontal rotation shaft 114.

In the horizontal rotary unit. 108, a horizontal driving unit 115 including a horizontal driving motor, a horizontal angle detector (an encoder, for instance) 116 for detecting a rotation angle of the horizontal rotation shaft 114 are accommodated. The frame unit 109 is rotated by the horizontal driving unit 115 around the horizontal rotation shaft 114 as the center, and a rotation angle of the horizontal rotation shaft 114 with respect to the base unit 107, that is, a rotation angle of the frame unit 109 is detected by the horizontal angle detector 116.

Further, a detection result (horizontal angle) of the horizontal angle detector 116 is input to an arithmetic control module 29, and a driving of the horizontal driving unit 115 is controlled by the arithmetic control module 29 based on the detection result.

The frame unit 109 has a recessed portion 117 formed at a center part, and rooms 118a and 118b are formed so as to be horizontally sandwiched by the recessed portion 117. In the one room 118a (a room on a left side in the figure), a vertical driving unit 119 including a vertical driving motor and a vertical angle detector 120 are accommodated, while in the other room 118b (a room on a right side in the figure), a distance measuring optical unit 122, a light emitter 41, a photodetector 52, a timing generating circuit 81, a driver 82, a light receiving processing module 83 and the like are accommodated. Further, the arithmetic control module 29 and the like are accommodated inside the frame unit 109.

A distance measuring light 46 as pulse-emitted from the light emitter 41 enters the scanning mirror 112 via the distance measuring optical unit 122 coaxially with a rotation axis of the scanning mirror 112, and the scanning mirror 112 reflects the distance measuring light 46 at a right angle. That is, the scanning mirror 112 and the vertical driving unit 119 make up an optical axis deflector which deflects a distance measuring optical axis at a right angle with respect to an axis (horizontal axis) of the vertical rotation shaft 111.

When the scanning mirror 112 is rotated at a high speed by the vertical driving unit 119, the distance measuring light 46 is one-dimensionally scanned in a plane orthogonal to the horizontal axis. Further, the frame unit 109 is horizontally rotated by the horizontal driving unit 115, and by a cooperative operation between a vertical rotation of the scanning mirror 112 and a horizontal rotation of the frame unit 109, the distance measuring light 46 is two-dimensionally scanned.

A scanning unit is constituted by the scanning mirror 112, the vertical driving unit 119, the vertical angle detector 120 and the like, and further, a two-dimensional scanning unit is constituted by adding the horizontal rotary unit 108 to the scanning unit.

Further, a reflected distance measuring light 47 reflected by an object to be measured enters the scanning mirror 112, is deflected at a right angle, and enters the distance measuring optical unit 122. The reflected distance measuring light 47 is entered to the photodetector 52 by the distance measuring optical unit 122. A light receiving signal from the photodetector 52 is produced, and the light receiving signal is input to the light receiving signal processing module 83 in the light receiving signal processing module 83, required signal processings such as a coarse measurement, a precise measurement and the like are executed based on the light receiving signal.

A timing signal issued from the timing generating circuit 81 is input to the driver 82 and the light receiving signal processing module 83.

Similarly to the first embodiment, a timing is set such that the light emitter 41 is emitted in a long cycle including a pulsed light emission in a short cycle, and in the pulsed light emission in the short cycle, a pulsed light is multiply irradiated with respect to a measuring point.

Thus, by applying the present invention to the general laser scanner, a predetermined measuring point can be measured with high accuracy, and not only a measurement of point cloud data but also a measurement of the predetermined measuring point can be performed by the laser scanner.

It is to be noted that the laser scanner 105 may be mounted on an unmanned aerial vehicle 2. In this case, the laser scanner 105 is provided so that the vertical rotation shaft 111 is horizontal and in parallel or in substantially parallel to an advancing direction of the unmanned aerial vehicle 2, and a scanning plane by the scanning mirror 112 is orthogonal to the advancing direction. It is to be noted that in this case, the horizontal rotary unit 108 and the leveling unit 106 can be omitted.

The invention claimed is:

1. A laser measuring method, wherein a scanning is performed while irradiating a pulsed distance measuring light to a measuring point, a reflected distance measuring light from said measuring point is received, a reciprocating time per pulsed light of said pulsed distance measuring light is detected with respect to said measuring point, and a distance measurement is performed based on the reciprocating time, comprising steps of emitting a pulsed light intermittently in a long cycle including a group light emission for making a pulsed light emit in a short cycle by a predetermined number of times and a pause of a light emission for making the light emission pause by a predetermined time, determining an irradiating point of a first pulsed light of said group light emission as a measuring point, setting a scanning speed and a short cycle of said pulsed light such that all said pulsed lights include said measuring point and such that said measuring point is multiply overlap irradiated with the pulsed light by two or more times within a time when all said pulsed lights of said group light emission pass said measuring point, carrying out a coarse measurement based on a first light receiving signal acquired by multiply overlap irradiating the pulsed light by two or more times, advancing sequentially by the short cycle and integrating the light receiving signals acquired by multiply overlap irradiating the pulsed light by two or more times and carrying out a precise measurement of said measuring point based on the integrated light receiving signals.

2. The laser measuring method according to claim 1, wherein said light receiving signals are acquired with respect to said two or more reflected distance measuring lights acquired by one pulsed light, respectively, and the distance measurement is performed with respect to said two or more light receiving signals.

3. The laser measuring method according to claim 1, wherein said light emission cycle is a distance measuring time difference or more corresponding to a difference of an irregularity of an object to be measured.

4. The laser measuring method according to claim 1, wherein a mode of said scanning is a two-dimensional scanning.

5. The laser measuring method according to claim 1, wherein a mode of said scanning is a circular scanning.

6. A laser measuring instrument comprising: a light emitter for pulse-emitting a distance measuring light, a driver for making said light emitter pulse-emit, a scanning unit for scanning while irradiating said distance measuring light, a light receiving signal processing module for receiving a reflected distance measuring light from a measuring point, detecting a reciprocating time per pulsed light of said distance measuring light with respect to said measuring point, and performing a distance measurement based on the reciprocating time, and a timing generating circuit for issuing a timing signal for controlling a light emission timing of said light emitter and a timing signal for controlling a detection timing of said reflected distance measuring light, wherein said timing generating circuit is configured to generate a timing signal for making said light emitter intermittently emit in a long cycle including a group light emission and a pause of a light emission and to input a timing signal for group light emitting said light emitter in a short cycle by two or more times and a timing signal for pausing a light emission to said driver, said driver is configured to make said light emitter group light emit according to the timing signals from said timing generating circuit, and to determine an irradiating point of a first pulsed light of said group light emission as a measuring point, a light emission time interval in said short cycle is set such that said measuring point is multiply overlap irradiated with the pulsed light by two or more times within a time when the pulsed light passes said measuring point, and said light receiving signal processing module is configured to carry out a coarse measurement based on a first light receiving signal acquired by multiply overlap irradiating the pulsed light by two or more times, to advance sequentially by the short cycle and to integrate the light receiving signals acquired by multiply overlap irradiating the pulsed light by two or more times and to carry out a precise measurement of said measuring point based on the integrated light receiving signals.

7. The laser measuring instrument according to claim 6, wherein said light receiving signal processing module acquires light receiving signals with respect to said two or more reflected distance measuring lights acquired by one pulsed light, respectively, and performs the distance measurement with respect to the two or more light receiving signals, respectively.

8. The laser measuring instrument according to claim 6, wherein a light emission time interval in said short cycle is a distance measuring time difference or more corresponding to a difference of an irregularity of an object to be measured.

9. The laser measuring instrument according to claim 6, wherein the laser measuring instrument comprises a plurality of light emitters, projecting lenses for irradiating said distance measuring lights from said light emitters to an object to be measured and a focusing lens for focusing said reflected distance measuring lights reflected from the object to be measured on photodetectors, wherein said photodetectors are provided in the number corresponding to said light emitters, and each of said light emitters and each of said photodetectors are provided at positions conjugated in relation to an optical system having said projecting lenses and said focusing lens.

10. The laser measuring instrument according to claim 6, wherein the laser measuring instrument comprises a plurality of light emitters, projecting lenses for irradiating said distance measuring lights from said light emitters to an object to be measured and a focusing lens for focusing said reflected distance measuring lights reflected from the object to be measured on photodetectors, wherein optical fibers having a light receiving end surface corresponding to said light emitters are provided on said photodetectors, each of said light emitters and each of said light receiving end surfaces are provided at positions conjugated in relation to an optical system having said projecting lenses and said focusing lens, and said photodetectors are configured to receive said two or more reflected distance measuring lights via said optical fibers.

11. The laser measuring instrument according to claim 6, wherein said scanning unit has an optical axis deflector for deflecting a distance measuring optical axis, said optical axis deflector is constituted by a pair of disk-like optical prisms overlapping each other, each of said optical prisms includes a first optical axis deflector provided at a center and for deflecting said distance measuring light and a second optical axis deflector provided on a periphery of said first optical axis deflector and for deflecting said reflected distance measuring light, each of said optical prisms is rotatable independently, respectively, and said scanning unit is configured to integrally rotate said optical prisms and circularly scan said distance measuring light.

12. The laser measuring instrument according to claim 6, wherein said scanning unit has an optical axis deflector for deflecting a distance measuring optical axis, said optical axis deflector has a scanning mirror which rotates in a vertical direction around a vertical rotation shaft as a center, said distance measuring light enters said scanning mirror concentrically with a rotation axis, and said distance measuring light is deflected by said scanning mirror at a right angle and is one-dimensionally scanned by said scanning mirror.

13. The laser measuring instrument, wherein said laser measuring instrument according to claim 6 is mounted on an unmanned aerial vehicle and an optical axis of said laser measuring instrument is directed vertically downward.

14. The laser measuring instrument, wherein said laser measuring instrument according to claim 6 is installed on an immovable body via an installation device, and an optical axis of said laser measuring instrument is directed to a horizontal direction.

* * * * *